US011507873B1

(12) United States Patent
Cohen et al.

(10) Patent No.: US 11,507,873 B1
(45) Date of Patent: Nov. 22, 2022

(54) HIGHLY SCALABLE QUANTUM CONTROL

(71) Applicant: Quantum Machines, Tel Aviv (IL)

(72) Inventors: Yonatan Cohen, Tel Aviv (IL); Nissim Ofek, Tel Aviv (IL); Itamar Sivan, Tel Aviv (IL); Ori Weber, Tel Aviv (IL)

(73) Assignee: Quantum Machines

( * ) Notice: Subject to any disclaimer, the term of this patent is extended or adjusted under 35 U.S.C. 154(b) by 507 days.

(21) Appl. No.: 16/715,537

(22) Filed: Dec. 16, 2019

(51) Int. Cl.
*G06N 10/00* (2022.01)
*G06F 9/30* (2018.01)

(52) U.S. Cl.
CPC ......... *G06N 10/00* (2019.01); *G06F 9/30181* (2013.01); *G06F 9/30043* (2013.01)

(58) Field of Classification Search
CPC .. G06N 10/00; G06F 9/30181; G06F 9/30043
See application file for complete search history.

(56) References Cited

U.S. PATENT DOCUMENTS

| 4,875,484 | A | 10/1989 | Anzai et al. |
| 6,993,108 | B1 | 1/2006 | Chi et al. |
| 7,627,126 | B1 | 12/2009 | Pikalo |
| 8,315,969 | B2 | 11/2012 | Roetteler |
| 8,385,878 | B2 | 2/2013 | Rao |
| 8,750,717 | B1 | 6/2014 | Yap et al. |
| 9,207,672 | B2 | 12/2015 | Williams |
| 9,400,499 | B2 | 7/2016 | Williams |
| 9,509,324 | B2 | 11/2016 | McDonald et al. |
| 9,692,423 | B2 | 6/2017 | McDermott, III |
| 9,847,121 | B2 | 12/2017 | Frank |
| 9,858,531 | B1 | 1/2018 | Monroe |
| 9,892,365 | B2 | 2/2018 | Rigetti |
| 9,978,020 | B1 | 5/2018 | Gambetta |
| 9,979,400 | B1 | 5/2018 | Sete |
| 9,996,801 | B2 | 6/2018 | Shim |
| 10,063,228 | B2 | 8/2018 | Deurloo et al. |
| 10,122,351 | B1 | 11/2018 | Naaman |
| 10,127,499 | B1 | 11/2018 | Rigetti |
| 10,192,168 | B2 | 1/2019 | Rigetti |
| 10,333,503 | B1 * | 6/2019 | Cohen ............... G06F 15/80 |
| 10,454,459 | B1 | 10/2019 | Cohen |
| 10,496,069 | B2 | 12/2019 | Nazarathy et al. |
| 10,505,524 | B1 * | 12/2019 | Cohen ............... H03K 3/38 |
| 10,560,076 | B1 | 2/2020 | Cohen |

(Continued)

FOREIGN PATENT DOCUMENTS

CN 105281886 1/2016
CN 105912070 A 8/2016

(Continued)

OTHER PUBLICATIONS

U.S. Appl. No. 62/294,966, filed Feb. 12, 2016.

(Continued)

*Primary Examiner* — Daniel D Chang
(74) *Attorney, Agent, or Firm* — McAndrews, Held & Malloy, Ltd.

(57) ABSTRACT

A system comprising a quantum control data exchange circuit that enables a large, variable number of pulse generation circuits to exchange data within the coherence time of a plurality of quantum elements to enable feedback-based quantum control of a large, variable number of quantum elements.

19 Claims, 10 Drawing Sheets

(56) References Cited

U.S. PATENT DOCUMENTS

| | | |
|---|---|---|
| 10,637,449 B1 | 4/2020 | Cohen et al. |
| 10,659,018 B1 | 5/2020 | Cohen |
| 10,666,238 B1 | 5/2020 | Cohen |
| 10,958,253 B1 | 3/2021 | Cohen et al. |
| 10,985,739 B2 | 4/2021 | Cohen et al. |
| 11,010,145 B1 | 5/2021 | Smith et al. |
| 2016/0125311 A1 | 5/2016 | Fuechsle et al. |
| 2016/0267032 A1 | 9/2016 | Rigetti et al. |
| 2016/0292586 A1 | 10/2016 | Rigetti et al. |
| 2017/0214410 A1 | 7/2017 | Hincks et al. |
| 2017/0364796 A1 | 12/2017 | Wiebe |
| 2018/0013426 A1 | 1/2018 | Deurloo et al. |
| 2018/0032893 A1 | 2/2018 | Epstein |
| 2018/0091244 A1 | 3/2018 | Abdo |
| 2018/0123597 A1 | 5/2018 | Sete |
| 2018/0260245 A1 | 9/2018 | Smith |
| 2018/0260730 A1 | 9/2018 | Reagor |
| 2018/0260732 A1 | 9/2018 | Bloom |
| 2018/0308007 A1 | 10/2018 | Amin |
| 2018/0322409 A1 | 11/2018 | Barends |
| 2018/0365585 A1 | 12/2018 | Smith |
| 2018/0375650 A1 | 12/2018 | Legre |
| 2019/0042964 A1 | 2/2019 | Elsherbini et al. |
| 2019/0042965 A1 | 2/2019 | Clarke |
| 2019/0042970 A1 | 2/2019 | Zou |
| 2019/0042972 A1 | 2/2019 | Zou |
| 2019/0042973 A1 | 2/2019 | Zou |
| 2019/0049495 A1 | 2/2019 | Ofek |
| 2020/0364602 A1 | 11/2020 | Niu et al. |
| 2021/0004707 A1 | 1/2021 | Gambetta et al. |

FOREIGN PATENT DOCUMENTS

| | | |
|---|---|---|
| CN | 108111306 A | 6/2018 |
| CN | 110085094 A | 8/2019 |
| CN | 2020033807 | 2/2020 |
| CN | 111464154 | 7/2020 |
| CN | 111767055 A | 10/2020 |
| CN | 112019193 | 12/2020 |
| JP | 2011175078 | 9/2011 |
| WO | 2015/178992 | 11/2015 |
| WO | 2015178991 | 11/2015 |
| WO | 2017078735 | 5/2017 |
| WO | 2017139683 A1 | 8/2017 |
| WO | 2019063117 | 4/2019 |

OTHER PUBLICATIONS

Int'l Search Report and Written Opinion Appln No. PCT/IB2019/001394 dated Jun. 17, 2020.

Zhang J, Hegde SS, Suter D. Pulse sequences for controlled 2-and 3-qubit gates in a hybrid quantum register. arXiv preprint arXiv:1806.08408. Jun. 21, 2018.

Wang CY, Kuznetsova L, Gkortsas VM, Diehl L, Kaertner FX, Belkin MA, Belyanin A, Li X, Ham D, Schneider H, Grant P. Mode-locked pulses from mid-infrared quantum cascade lasers. Optics Express. Jul. 20, 2009;17(15):12929-43.

Int'l Preliminary Report on Patentability Appln No. PCT/IB2019/001410 dated Jun. 10, 2021.

Int'l Search Report and Written Opinion Appln No. PCT/IB2021/000067 dated Jun. 21, 2021.

Int'l Preliminary Report on Patentability Appln No. PCT/IB2019/001394 dated Jul. 29, 2021.

Int'l Preliminary Report on Patentability Appln No. PCT/IB2020/000218 dated Sep. 16, 2021.

Int'l Preliminary Report on Patentability Appln No. PCT/IB2020/000376 dated Nov. 12, 2021.

Int'l Search Report and Written Opinion Appln No. PCT/IB2021/056254 dated Dec. 1, 2021.

Ribeiro, Diogo C., Pedro M. Cruz, and Nuno Borges Carvalho, "Towards a denser frequency grid in phase measurements using mixer-based receivers." 2015 85th Microwave Measurement Conference (ARFTG). IEEE, 2015. Dec. 31, 2015 (Dec. 31, 2015).

Int'l Preliminary Report on Patentability Appln No. PCT/IB2020/000555 dated Feb. 10, 2022.

Int'l Preliminary Report on Patentability Appln No. PCT/IB2020/000707 dated Mar. 17, 2022.

Int'l Preliminary Report on Patentability Appln No. PCT/IB2020/000704 dated Mar. 17, 2022.

Int'l Preliminary Report on Patentability Appln No. PCT/IB2020/000760 dated Apr. 7, 2022.

Int'l Search Report and Written Opinion Appln No. PCT/IB2022/050190 dated Apr. 11, 2022.

Int'l Search Report and Written Opinion Appln No. PCT/IB2020/000376 dated Sep. 17, 2020.

Breitfelder et al. eds., IEEE 100: The Authoritative Dictionary of IEEE Standards Terms 1247, definition 2 of "variable" (7th ed. 2000). (Year: 2000).

Int'l Search Report and Written Opinion Appln No. PCT/IB2020/000707 dated Jan. 12, 2021.

National Academies of Sciences, Engineering, and Medicine. "Quantum Computing: Progress and Prospects". eprint (Dec. 2018) [online]. [retrieved on Jan. 7, 2020]. retrieved from: <https://doi.org/10.17226/25196.> Dec. 4, 2018 (Dec. 4, 2018) pp. 114, 142, 210, Fig. 2.5.

IBM Research. "Qiskit Backend Specifications for OpenQASM and OpenPulse Experiments". eprint arXiv:1809.03452v1 (Sep. 10, 2018) [online]. [retrieved on Jan. 7, 2020]. retrieved from: <https://arxiv.org/pdf/1809.03452.pdf.

Int'l Search Report and Written Opinion Appln No. PCT/IB2020/000704 dated Jan. 17, 2021.

Wolfowicz, et al. Pulse Techniques for Quantum Information Processing University of Chicago, University College London, eMagRes, 2016, vol. 5: 1515-1528. DOI 10.1002/9780470034590.emrstm1521.

Int'l Search Report and Written Opinion Appln No. PCT/IB2020/000555 dated Dec. 27, 2020.

"Quantum-classical interface based on single flux quantum digital logic". In: Quantum Science and Technology 3.2 (2018), pp. 1-16. DOI: 10.1088/2058-9565/aaa3a0.(retrieved on Jan. 20, 2021). Retrieved from the Internet: < https://arxiv.org/pdf/1710.04645.pdf.

Roffe, J., Quantum Error Correction: An Introductory Guide, Dept. of Physics & Astronomy, Univ. of Sheffeld, UK, Oct. 10, 2019, pp. 1-29.

Int'l Search Report and Written Opinion Appln No. PCT/IB2020/001004 dated May 13, 2021.

Pulse Techniques for Quantum Information Processing University of Chicago, University College London Dec. 31, 2016.

Int'l Search Report and Written Opinion Appln No. PCT/IB2020/000218 dated Aug. 11, 2020.

Quan R, Zhai Y, Wang M, Hou F, Wang S, Xiang X, Liu T, Zhang S, Dong R. Demonstration of quantum synchronization based on second-order quantum coherence of entangled photons. Scientific reports. Jul. 25, 2016;6:30453. Jul. 25, 2016 (Jul. 25, 2016).

Int'l Search Report and Written Opinion Appln No. PCT/IB2019/001410 dated Jun. 10, 2020.

\* cited by examiner

HIGHLY SCALABLE QUANTUM CONTROL

BACKGROUND

Limitations and disadvantages of conventional approaches to quantum computer control systems will become apparent to one of skill in the art, through comparison of such approaches with some aspects of the present method and system set forth in the remainder of this disclosure with reference to the drawings.

DETAILED DESCRIPTION

Classical computers operate by storing information in the form of binary digits ("bits") and processing those bits via binary logic gates. At any given time, each bit takes on only one of two discrete values: 0 (or "off") and 1 (or "on"). The logical operations performed by the binary logic gates are defined by Boolean algebra and circuit behavior is governed by classical physics. In a modern classical system, the circuits for storing the bits and realizing the logical operations are usually made from electrical wires that can carry two different voltages, representing the 0 and 1 of the bit, and transistor-based logic gates that perform the Boolean logic operations.

Figure 1A:
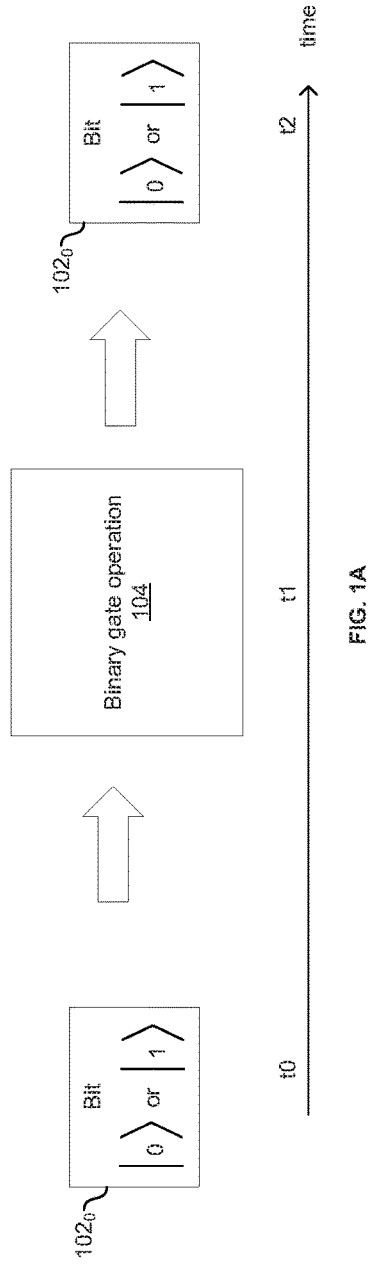
FIGS. 1A and 1B compare some aspects of classical (binary) computing and quantum computing.
Figure 1B:
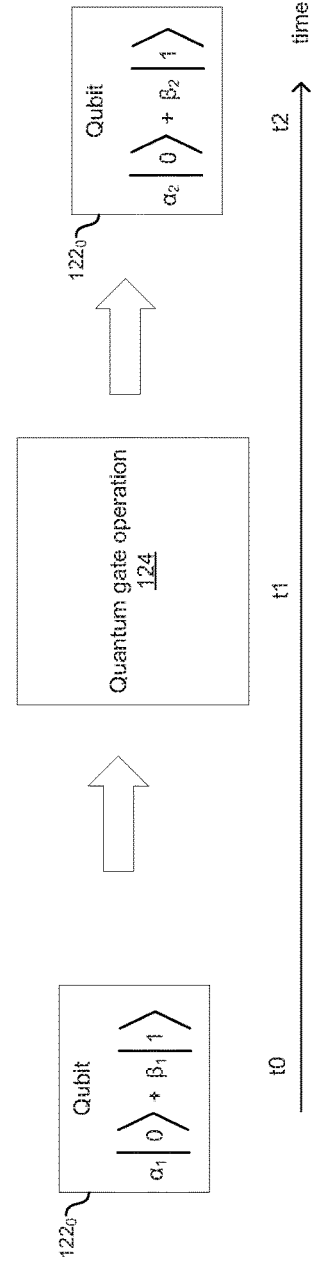

Shown in FIG. 1A is a simple example of a classical computer configured to a bit 102 and apply a single logic operation 104 to the bit 102. At time t0 the bit 102 is in a first state, at time t1 the logic operation 104 is applied to the bit 102, and at time t2 the bit 102 is in a second state determined by the state at time t0 and the logic operation. So, for example, the bit 102 may typically be stored as a voltage (e.g., 1 Vdc for a "1" or 0 Vdc for a "0") which is applied to an input of the logic operation 104 (comprised of one or more transistors). The output of the logic gate is then either 1 Vdc or 0 Vdc, depending on the logic operation performed.

Obviously, a classical computer with a single bit and single logic gate is of limited use, which is why modern classical computers with even modest computation power contain billions of bits and transistors. That is to say, classical computers that can solve increasingly complex problems inevitably require increasingly large numbers of bits and transistors and/or increasingly long amounts of time for carrying out the algorithms. There are, however, some problems which would require an infeasibly large number of transistors and/or infeasibly long amount of time to arrive at a solution. Such problems are referred to as intractable.

Quantum computers operate by storing information in the form of quantum bits ("qubits") and processing those qubits via quantum gates. Unlike a bit which can only be in one state (either 0 or 1) at any given time, a qubit can be in a superposition of the two states at the same time. More precisely, a quantum bit is a system whose state lives in a two dimensional Hilbert space and is therefore described as a linear combination $\alpha|0\rangle+\beta|1\rangle$, where $|0\rangle$ and $|1\rangle$ are two basis states, and $\alpha$ and $\beta$ are complex numbers, usually called probability amplitudes, which satisfy $|\alpha|^2+|\beta|^2=1$. Using this notation, when the qubit is measured, it will be 0 with probability $|\alpha|^2$ and will be 1 with probability $|\beta|^2$. $|0\rangle$ and $|1\rangle$ can also be represented by two-dimensional basis vectors $$\begin{bmatrix}1\\0\end{bmatrix} \text{ and } \begin{bmatrix}0\\1\end{bmatrix},$$

respectively, and then the qubit state is represented by $$\begin{bmatrix}\alpha\\\beta\end{bmatrix}.$$

The operations performed by the quantum gates are defined by linear algebra over Hilbert space and circuit behavior is governed by quantum physics. This extra richness in the mathematical behavior of qubits and the operations on them, enables quantum computers to solve some problems much faster than classical computers (in fact some problems that are intractable for classical computers may become trivial for quantum computers).

Shown in FIG. 16 is a simple example of a quantum computer configured to store a qubit 122 and apply a single quantum gate operation 124 to the qubit 122. At time t0 the qubit 122 is described by $\alpha_1|0\rangle+\beta_1|1\rangle$, at time t1 the logic operation 104 is applied to the qubit 122, and at time t2 the qubits 122 is described by $\alpha_2|0\rangle+\beta_2|1\rangle$.

Unlike a classical bit, a qubit cannot be stored as a single voltage value on a wire. Instead, a qubit is physically realized using a two-level quantum mechanical system. Many physical implementations of qubits have been proposed and developed over the years with some being more promising than others. Some examples of leading qubits implementations include superconducting circuits, spin qubits, and trapped ions.

It is the job of the quantum controller to generate the precise series of external signals, usually pulses of electromagnetic waves and pulses of base band voltage, to perform the desired logic operations (and thus carry out the desired quantum algorithm). Example implementations of a quantum controller are described in further detail below.

Figure 2:
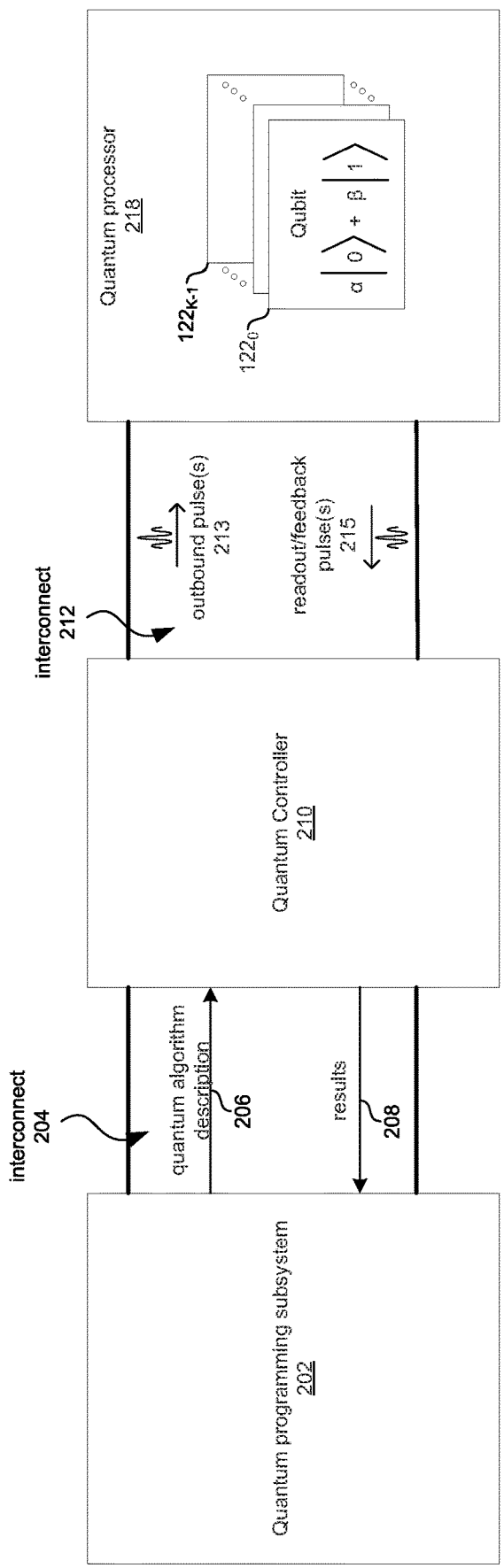
FIG. 2 shows an example quantum orchestration platform.

FIG. 2 shows an example quantum orchestration platform (QOP). The system comprises a quantum programming subsystem 202, a quantum controller 210, and a quantum processor 218.

The quantum programming subsystem 202 comprises circuitry operable to generate a quantum algorithm description 206 which configures the quantum controller 210 and includes instructions the quantum controller 210 can execute to carry out the quantum algorithm (i.e., generate the necessary outbound quantum control pulse(s) 213) with little or no human intervention during runtime. In an example implementation, the quantum programming system 202 is a personal computer comprising a processor, memory, and other associated circuitry (e.g., an x86 or x64 chipset) having installed on it a quantum orchestration software development kit (SDK) that enables creation (e.g., by a user via a text editor and/or by automated quantum algorithm description generation circuitry) of a high-level (as opposed to binary or "machine code") quantum algorithm description 206. In an example implementation, the high-level quantum algorithm description uses a high-level programming language (e.g., Python, R, Java, Matlab, etc.) simply as a "host" programming language in which are embedded the QOP programming constructs.

The high-level quantum algorithm description may comprise a specification and a program. The specification and program may be part of one or more larger databases and/or contained in one or more files (e.g., each may take the form of a plain-text file recognizable by an operating system such as Windows, Linux, Mac, or another OS) on which quantum programming subsystem runs. The quantum programming subsystem 202 then compiles the high-level quantum algorithm description 206 to a machine code version of the quantum algorithm description 206 (i.e., series of binary vectors that represent instructions that the quantum controller's hardware can interpret and execute directly).

The quantum programming subsystem 202 is coupled to the quantum controller 210 via interconnect 204 which may, for example, utilize universal serial bus (USB), peripheral component interconnect (PCIe) bus, wired or wireless Ethernet, or any other suitable communication protocol. The quantum controller 210 comprises circuitry operable to load the machine code quantum algorithm description 206 from the programming subsystem 202 via interconnect 204. Then, execution of the machine code by the quantum controller 210 causes the quantum controller 210 to generate the necessary outbound quantum control pulse(s) 213 that correspond to the desired operations to be performed on the quantum processor 218 (e.g., sent to qubit(s) for manipulating a state of the qubit(s) or to readout resonator(s) for reading the state of the qubit(s), etc.). Depending on the quantum algorithm to be performed, outbound pulse(s) 213 for carrying out the algorithm may be predetermined at design time and/or may need to be determined during runtime. The runtime determination of the pulses may comprise performance of classical calculations and processing in the quantum controller 210 and/or the quantum programing subsystem 202 during runtime of the algorithm (e.g., runtime analysis of inbound pulses 215 received from the quantum processor 218).

During runtime and/or upon completion of a quantum algorithm performed by the quantum controller 210, the quantum controller 210 may output data/results 208 to the quantum programming subsystem 202. In an example implementation these results may be used to generate a new quantum algorithm description 206 for a subsequent run of the quantum algorithm and/or update the quantum algorithm description during runtime.

The quantum controller 210 is coupled to the quantum processor 218 via interconnect 212 which may comprise, for example, one or more conductors and/or optical fibers. The quantum controller 210 may comprise a plurality of interconnected, but physically separate quantum control modules (e.g., each module being a desktop or rack mounted device) such that quantum control systems requiring relatively fewer resources can be realized with relatively fewer quantum control modules and quantum control systems requiring relatively more resources can be realized with relatively more quantum control modules.

The quantum processor 218 comprises K (an integer) quantum elements 122, which includes qubits (which could be of any type such as superconducting, spin qubits, ion trapped, etc.), and, where applicable, any other element(s) for processing quantum information, storing quantum information (e.g. storage resonator), and/or coupling the outbound quantum control pulses 213 and inbound quantum control pulses 215 between interconnect 212 and the quantum element(s) 122 (e.g., readout resonator(s)). In an example implementation in which the quantum processor comprises readout resonators (or other readout circuitry), K may be equal to the total number of qubits plus the number of readout circuits. That is, if each of Q (an integer) qubits of the quantum processor 218 is associated with a dedicated readout circuit, then K may be equal to 2Q. For ease of description, the remainder of this disclosure will assume such an implementation, but it need not be the case in all implementations. Other elements of the quantum processor 218 may include, for example, flux lines (electronic lines for carrying current), gate electrodes (electrodes for voltage gating), current/voltage lines, amplifiers, classical logic circuits residing on-chip in the quantum processor 218, and/or the like.

Figure 3A:
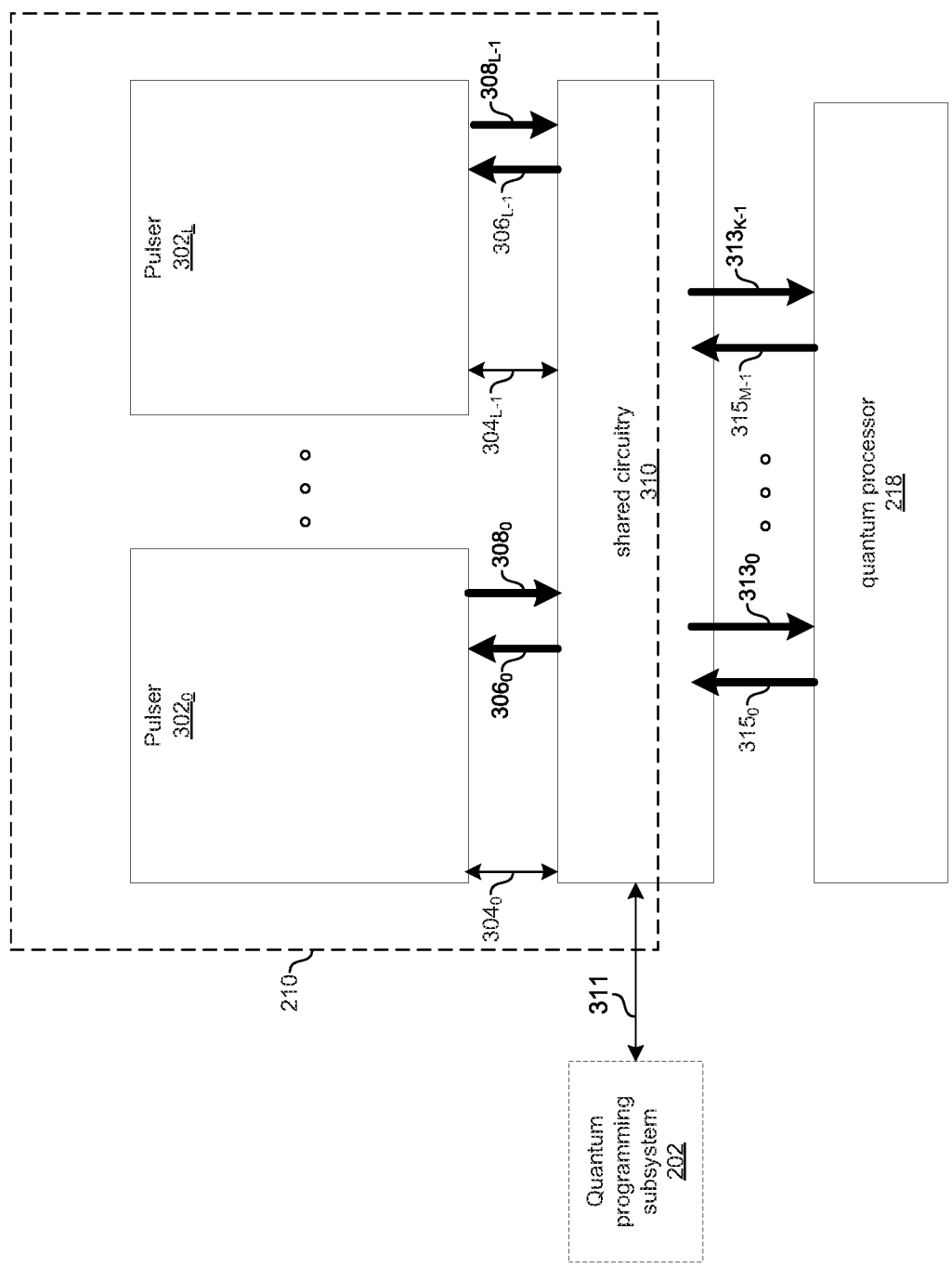
FIG. 3A shows an example quantum orchestration platform (QOP) architecture in accordance with various example implementations of this disclosure.

FIG. 3A shows an example quantum controller architecture in accordance with various example implementations of this disclosure. The quantum controller 210 comprises L (an integer ≥1) pulser circuits $302_0$-$302_{L-1}$ and shared circuitry 310.

In the example implementation shown, each pulser circuit $302_I$ (I an integer between 0 and L−1) comprises circuitry for exchanging information over signal paths $304_I$, $306_I$, and $308_I$ where the signal path $308_I$ carries outbound pulses (e.g., 213 of FIG. 2) generated by the pulser circuit $302_I$ (which may be, for example, control pulses sent to the quantum processor 218 to manipulate one or more properties of one or more quantum elements—e.g., manipulate a state of one or more qubits, manipulate a frequency of a qubit using flux biasing, etc., and/or readout a state of one or more quantum elements), the signal path $306_I$ carries inbound quantum element readout pulses (e.g., 215 of FIG. 2) to be processed by the pulser circuit $302_I$, and signal path $304_I$ carries control information. Each signal path may comprise one or more conductors, optical channels, and/or wireless channels.

Each pulser circuit $302_I$ comprises circuitry operable to generate outbound pulses on signal path $308_I$ according to quantum control operations to be performed on the quantum processor 218. This involves very precisely controlling characteristics such as phase, frequency, amplitude, and timing of the outbound pulses. The characteristics of an outbound pulse generated at any particular time may be determined, at least in part, on inbound pulses received from the quantum processor 218 (via shared circuitry 310 and signal path $306_I$) at a prior time. In an example implementation, the time required to close the feedback loop (i.e., time from receiving a first pulse on one or more of paths $315_1$-$315_L$ (e.g., at an analog to digital converter of the path) to sending a second pulse on one or more of paths $313_0$-$313_{L-1}$ (e.g., at an output of a digital-to-analog converter of the path), where the second pulse is based on the first pulse, is significantly less than the coherence time of the qubits of the quantum processor 218. For example, the time to close the feedback loop may be on the order of 100 nanoseconds.

It should be noted that each signal path in FIG. 3A may in practice be a set of signal paths for supporting generation of multi-pulse sets (e.g., two signal paths for two-pulse pairs, three signal paths for three-pulse sets, and so on).

In the example implementation shown, the shared circuitry 310 comprises circuitry for exchanging information with the pulser circuits $302_0$-$302_{L-1}$ over signal paths $304_0$-$304_{L-1}$, $306_0$-$306_{L-1}$, and $308_0$-$308_{L-1}$, where each signal path $308_l$ carries outbound pulses generated by the pulser circuit $302_l$ each signal path $306_l$ carries inbound pulses to be processed by pulser circuit $302_l$, and each signal path $304_l$ carries control information such as flag/status signals, data read from memory, data to be stored in memory, data streamed to/from the quantum programming subsystem 202, and data to be exchanged between two or more pulsers $302_0$-$302_L$. Similarly, in the example shown the shared circuitry 310 comprises circuitry for exchanging information with the quantum processor 218 over signal paths $315_0$-$315_{M-1}$ and $313_1$-$313_{K-1}$, where each signal path $315_m$ (m an integer between 0 and M−1) carries inbound pulses from the quantum processor 218, and each signal path $313_k$ (k an integer between 0 and K−1) carries outbound pulses to the quantum processor 218. Additionally, in the example shown the shared circuitry 310 comprises circuitry for exchanging information with the quantum programming subsystem over signal path 311. The shared circuitry 310 may be: integrated with one or more modules of the quantum controller 210 (e.g., residing on one or more of the same field programmable gate arrays or application specific integrated circuits or printed circuit boards); external to the quantum controller 210 (e.g., on one or more a separate FPGAs, ASICs, or PCBs connected to the quantum controller via one or more cables, backplanes, or other devices connected to the quantum processor 218, etc.); or partially integrated with the quantum controller 210 and partially external to the quantum controller 210.

In various implementations, M may be less than, equal to, or greater than L, K may be less than, equal to, or greater than L, and M may be less than, equal to, or greater than K. For example, the nature of some quantum algorithms is such that not all K quantum elements need to be driven at the same time. For such algorithms, L may be less than K and one or more of the L pulsers $302_l$ may be shared among multiple of the K quantum elements circuits. That is, any pulser $302_l$ may generate pulses for different quantum elements at different times. This ability of a pulser $302_l$ to generate pulses for different quantum elements at different times can reduce the number of pulsers $302_0$-$302_{L-1}$ (i.e., reduce L) required to support a given number of quantum elements (thus saving significant resources, cost, size, overhead when scaling to larger numbers of qubits, etc.).

Figure 3B:
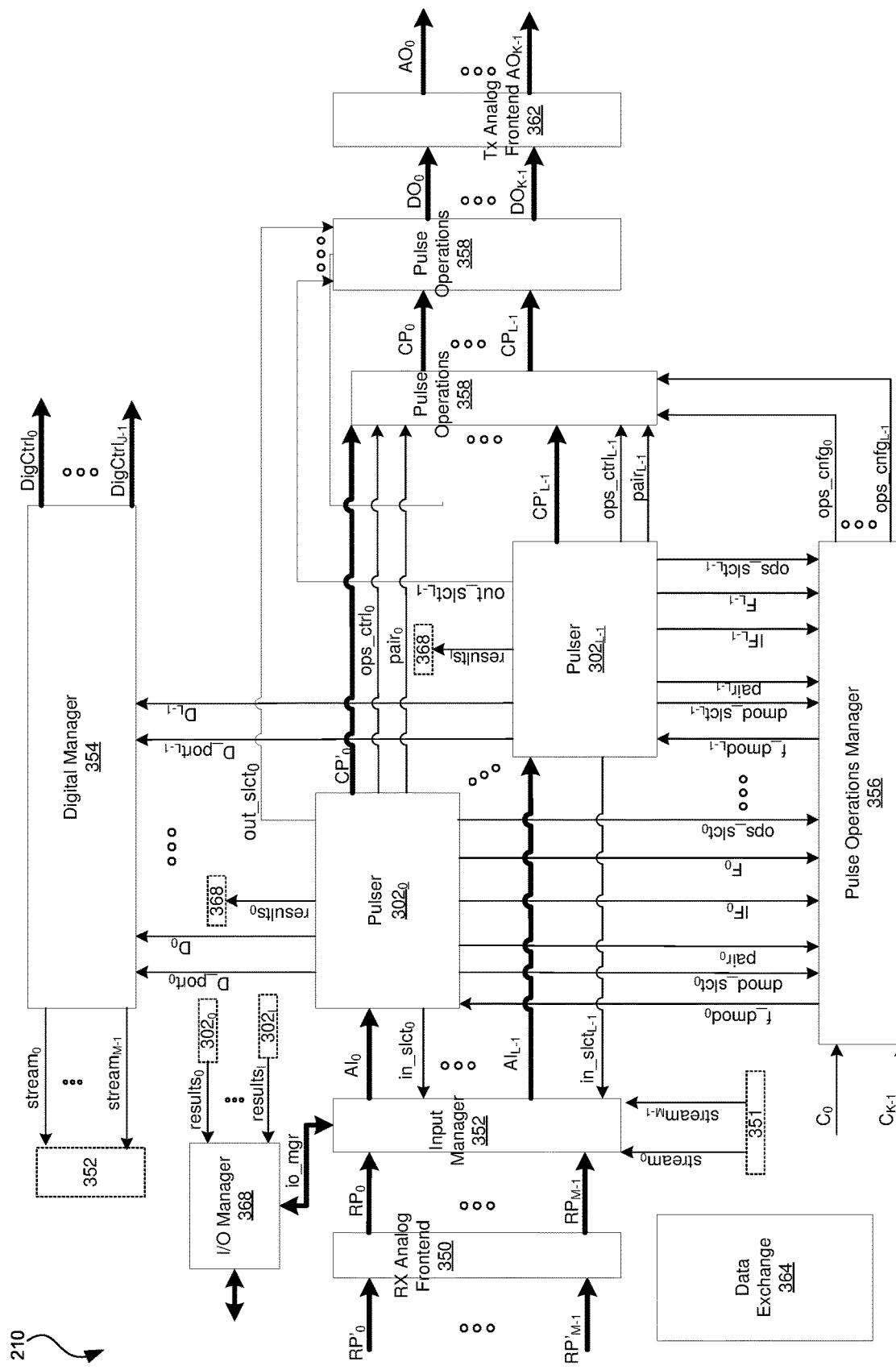
FIG. 3B shows an example implementation of the quantum controller circuitry of FIG. 3A.

The ability of a pulser $302_l$ to generate pulses for different quantum elements at different times also enables reduced latency. As just one example, assume a quantum algorithm which needs to send a pulse to quantum element $122_0$ at time T1, but whether the pulse is to be of a first type or second type (e.g., either an X pulse or a Hadamard pulse) cannot be determined until after processing an inbound readout pulse at time T1-DT (i.e., DT time intervals before the pulse is to be output). If there were a fixed assignment of pulsers $302_0$-$302_{L-1}$ to quantum elements of the quantum processor 218 (i.e., if $302_0$ could only send pulses to quantum element $122_0$, and $302_1$ could only send pulses to quantum element $122_1$, and so on), then pulser $302_0$ might not be able to start generating the pulse until it determined what the type was to be. In the depicted example implementation, on the other hand, pulser $302_0$ can start generating the first type pulse and pulser $302_1$ can start generating the second type pulse and then either of the two pulses can be released as soon as the necessary type is determined. Thus, if the time to generate the pulse is $T_{lat}$, in this example the example quantum controller 210 may reduce latency of outputting the pulse by $T_{lat}$. The pulsers $302_0$ and $302_1$ in this example may reside in different quantum control modules interconnected via a quantum exchange circuit, as discussed in more detail below.

he shared circuitry 310 is thus operable to receive pulses via any one or more of the signals paths $308_0$-$308_{L-1}$ and/or $315_0$-$315_{M-1}$, process the received pulses as necessary for carrying out a quantum algorithm, and then output the resulting processed pulses via any one or more of the signal paths $306_0$-$306_{L-1}$ and/or $313_0$-$313_{K-1}$. The processing of the pulses may take place in the digital domain and/or the analog domain. The processing may comprise, for example: frequency translation/modulation, phase translation/modulation, frequency and/or time division multiplexing, time and/or frequency division demultiplexing, amplification, attenuation, filtering in the frequency domain and/or time domain, time-to-frequency-domain or frequency-to-time-domain conversion, upsampling, downsampling, and/or any other signal processing operation. At any given time, the decision as to from which signal path(s) to receive one or more pulse(s), and the decision as to onto which signal path(s) to output the pulse(s) may be: predetermined (at least in part) in the quantum algorithm description; and/or dynamically determined (at least in part) during runtime of the quantum algorithm based on classical programs/computations performed during runtime, which may involve processing of inbound pulses and/or exchange of computation results among pulsers via a quantum control data exchange circuit of the shared circuitry. As an example of predetermined pulse generation and routing, a quantum algorithm description may simply specify that a particular pulse with predetermined characteristics is to be sent to signal path $313_1$ at a predetermined time. As an example of dynamic pulse determination and routing, a quantum algorithm description may specify that an inbound readout pulse at time T-DT should be analyzed and its characteristics (e.g., phase, frequency, and/or amplitude) used to determine, for example, whether at time T pulser $302_l$ should output a pulse to a first quantum element or to a second quantum element or to determine, for example, whether at time T pulser $302_l$ should output a first pulse to a first quantum element or a second pulse to the first quantum element. In some instances, the analysis of the inbound pulse may be performed in a first pulser (e.g., $302_{l-1}$) and conveyed to the pulser $302_l$ via a quantum control data exchange circuit of the shared circuitry. In various implementations of the quantum controller 210, the shared circuitry 310 may perform various other functions instead of and/or in addition to those described above. In general, the shared circuitry 310 may perform functions that are desired to be performed outside of the individual pulser circuits $302_0$-$302_{L-1}$. For example, a function may be desirable to implement in the shared circuitry 310 where the same function is needed by a number of pulser circuits from $302_0$-$302_{L-1}$ and thus may be shared among these pulser circuits instead of redundantly being implemented inside each pulser circuit. As another example, a function may be desirable to implement in the shared circuitry 310 where the function is not needed by all pulser circuits $302_0$-$302_{L-1}$ at the same time and/or on the same frequency and thus fewer than L circuits for implementing the function may be shared among the L pulser circuits $302_0$-$302_{L-1}$ through time and/or frequency division multiplexing. As another example, a function may be desirable to implement in the shared circuitry 310 where the function involves making decisions based on inputs, outputs, and/or state of multiple of the L pulser circuits $302_0$-$302_{L-1}$, or other circuits. Utilizing a centralized coordinator/decision maker in the shared circuitry 310 may have the benefit(s) of: (1) reducing pinout and complexity of the pulser circuits $302_0$-$302_{L-1}$; and/or (2) reducing decision-making latency. Nevertheless, in some implementations, decisions affecting multiple pulser circuits $302_0$-$302_{L-1}$ may be made by one or more of the pulser circuits $302_0$-$302_{L-1}$ where the information necessary for making the decision can be communicated among pulser circuits within a suitable time frame (e.g., still allowing the feedback loop to be closed within the qubit coherence time) over a tolerable number of pins/traces. FIG. 3B shows an example implementation of the quantum controller of FIG. 2. The example quantum controller shown comprises pulsers $302_1$-$302_{L-1}$, receive analog frontend 350, input manager 352, digital manager 354, pulse operations manager 356, pulse operations 358, output manager 360, transmit analog frontend 362, and input/output ("I/O") manager 368. Circuitry depicted in FIG. 3B other than pulser circuits $302_0$-$302_{L-1}$ corresponds to an example implementation of the shared circuitry 310 of FIG. 3A. The connections to the quantum control data exchange circuitry are discussed with respect to subsequent figures and not shown in FIG. 3B.

The receive analog frontend 350 comprises circuitry operable to concurrently process up to M (an integer 1) analog inbound signals ($RP'_0$-$RP'_{M-1}$) received via signal paths $315_0$-$315_{M-1}$ to generate up to M concurrent inbound signals ($RP_0$-$RP_{M-1}$) to be output to input manager 352 via one or more signal paths. Although there is shown to be M signals RP and M signals RP', this need not be the case. Such processing may comprise, for example, analog-to-digital conversion, filtering, upconversion, downconversion, amplification, attenuation, time division multiplexing/demultiplexing, frequency division multiplexing/demultiplexing, and/or the like. In various implementations, M may be less than, equal to, or greater than L and M may be less than, equal to, or greater than K.

The input manager 352 comprises circuitry operable to route any one or more of signals ($RP_0$-$R_{PM-1}$) to any one or more of pulsers $302_0$-$302_{L-1}$ (as signal(s) $AI_0$-$AI_{L-1}$) and/or to other circuits (e.g. as signal io_mgr to I/O manager 368). In an example implementation, the input manager 352 comprises one or more switch networks, multiplexers, and/or the like for dynamically reconfiguring which signals $RP_0$-$RP_{M-1}$ are routed to which pulsers $302_0$-$302_{L-1}$. This may enable time division multiplexing multiple of the signals $RP_0$-$RP_{M-1}$ onto a single signal $AI_I$ and/or time division demultiplexing components (e.g., time slices) of a signal $RP_m$ onto multiple of the signals $AI_0$-$AI_{L-1}$. In an example implementation, the input manager 352 comprises one or more mixers and/or filters for frequency division multiplexing multiple of the signals $RP_0$-$RP_{M-1}$ onto a single signal $AI_I$ and/or frequency division demultiplexing components (e.g., frequency bands) of a signal $RP_m$ onto multiple of the signals $AI_0$-$AI_{L-1}$. The signal routing and multiplexing/demultiplexing functions performed by the input manager 352 enables: a particular pulser $302_I$ to process different inbound pulses from different quantum elements at different times; a particular pulser $302_I$ to process different inbound pulses from different quantum elements at the same time; and multiple of the pulsers $302_0$-$302_{L-1}$ to processes the same inbound pulse at the same time. In the example implementation shown, routing of the signals $RP_0$-$RP_{M-1}$ among the inputs of the pulsers $302_0$-$302_{L-1}$ is controlled by digital control signals in_slct$_0$-in_slct$_{L-1}$ from the pulsers $302_0$-$302_{L-1}$. In another implementation, the input manager may be operable to autonomously determine the appropriate routing (e.g., where the quantum algorithm description includes instructions to be loaded into memory of, and executed by, the input manager 352). In the example implementation, the input manager 352 is operable to rout input signals $RP_0$-$RP_{M-1}$ to the I/O manager 368 (as signal(s) io_mgr), to be sent to the quantum programing subsystem 202. This routing may, for example, be controlled by signals from the digital manager 354. In an example implementation, for each input signal $RP_m$ there is a digital signal, stream$_m$, from the digital manager 354 to the input manager 352 that controls whether $RP_m$ will be sent from the input manager 352 to the I/O manager 368 and from there to the quantum programing subsystem 202.

Each of the pulsers $302_0$-$302_{L-1}$ is as described above with reference to FIG. 3A. In the example implementation shown, each pulser $302_I$ is operable to generate raw outbound pulses $CP'_I$ ("raw" is used simply to denote that the pulse has not yet been processed by pulse operations circuitry 358) and digital control signals in_slct$_I$, D_port$_I$, $D_I$, out_slct$_I$, ops_ctrl$_I$, ops_slct$_I$, $IF_I$, $F_I$, and dmod_sclt$_I$ for carrying out quantum algorithms on the quantum processor 218, and results$_I$ for carrying intermediate and/or final results generated by the pulser $302_I$ to the quantum programming subsystem 202. One or more of the pulsers $302_0$-$302_{L-1}$ may receive and/or generate additional signals which are not shown in FIG. 3B for clarity of illustration. The raw outbound pulses $CP'_0$-$CP'_{L-1}$ are conveyed via signal paths $308_0$-$308_{L-1}$ and the digital control signals are conveyed via signal paths $304_0$-$304_{L-1}$. Each of the pulsers $302_I$ is operable to receive inbound pulse signal $AI_I$ and signal f_dmod$_I$. Pulser $302_I$ may process the inbound signal $AI_I$ to determine the state of certain quantum element(s) in the quantum processor 218 and use this state information for making decisions such as, for example, which raw outbound pulse $CP'_I$ to generate next, when to generate it, and what control signals to generate to affect the characteristics of that raw outbound pulse appropriately. The pulser $302_I$ may additionally share the results of processing $AI_I$ with others of the pulsers 3020-302L−1 via a quantum control data exchange circuit and those other pulsers may likewise make decisions about raw pulsers to be generated based on the processing of AiI performed by Pulser $302_I$. Likewise, the pulser $302_I$ may receive, via the quantum control data exchange circuit, the results of others of pulsers $302_0$-$302_{L-1}$ processing other inbound pulses AI and use such results in the generation of raw outbound pulse $CP'_I$. Pulser $302_I$ may use the signal f_dmod$_I$ for determining how to process inbound pulse signal $AI_I$. As an example, when pulser $302_1$ needs to process an inbound signal $AI_1$ from quantum element $122_3$, it can send a dmod_sclt$_1$ signal that directs pulse operations manager 356 to send, on f_dmod$_1$, settings to be used for demodulation of an inbound signal $AI_1$ from quantum element $122_3$ (e.g., the pulse operations manager 356 may send the value $\cos(\omega_3 * TS * T_{clk1} + \phi 3)$, where $\omega_3$ is the frequency of quantum element $122_3$, TS is amount of time passed since the reference point, for instance the time at which quantum algorithm started running, and $\phi_3$ is the phase of the total frame rotation of quantum element $122_3$, i.e. the accumulated phase of all frame rotations since the reference point).

The pulse operations circuitry 358 is operable to process the raw outbound pulses $CP'_0$-$CP'_{L-1}$ to generate corresponding output outbound pulses $CP_0$-$CP_{L-1}$. This may comprise, for example, manipulating the amplitude, phase, and/or frequency of the raw pulse $CP'_I$. The pulse operations circuitry 358 receives raw outbound pulses $CP'_0$-$CP'_{L-1}$ from pulsers $302_0$-$302_{L-1}$, control signals ops_cnfg$_0$-ops_cnfg$_{L-1}$ from pulse operations manager 356, and ops_ctrl$_0$-ops_ctrl$_{L-1}$ from pulsers $302_0$-$302_{L-1}$.

The control signal ops_cnfg$_I$ configures, at least in part, the pulse operations circuitry 358 such that each raw outbound pulse $CP'_I$ that passes through the pulse operations circuitry 358 has performed on it one or more operation(s) tailored for that particular pulse. To illustrate, denoting a raw outbound pulse from pulser $302_3$ at time T1 as $CP'_{3,T1}$, then, at time T1 (or sometime before T1 to allow for latency, circuit setup, etc.), the digital control signal ops_cnfg$_3$ (denoted ops_cnfg$_{3,T1}$ for purposes of this example) provides the information (e.g., in the form of one or more matrix, as described below) as to what specific operations are to be performed on pulse $CP'_{3,T1}$. Similarly, ops_cnfg$_{4,T1}$ provides the information as to what specific operations are to be performed on pulse $CP'_{4,T1}$, and ops_cnfg$_{3,T2}$ provides the information as to what specific operations are to be performed on pulse $CP'_{4,T1}$.

The control signal ops_ctrl$_I$ provides another way for the pulser $302_I$ to configure dynamically how any particular pulse is processed in the pulse operations circuitry 358. This may enable the pulser $302_I$ to, for example, provide information to the pulse operation circuitry 358 that does not need to pass through the pulse operation manager 356. For example, the pulser $302_I$ may send matrix values calculated in real-time by the pulser $302_I$ to be used by the pulse operation circuitry 358 to modify pulse $CP'_I$. These matrix values arrive to the pulse operation circuitry 358 directly from the pulser $302_I$ and do not need to be sent to the pulse operation manager first. Another example may be that the pulser $302_I$ provides information to the pulse operation circuitry 358 to affect the operations themselves (e.g. the signal ops_ctrl$_I$ can choose among several different mathematical operations that can be performed on the pulse).

The pulse operations manager 356 comprises circuitry operable to configure the pulse operations circuitry 358 such that the pulse operations applied to each raw outbound pulse $CP'_I$ are tailored to that particular raw outbound pulse. To illustrate, denoting a first raw outbound pulse to be output during a first time interval T1 as $CP'_{I,T1}$, and a second raw outbound pulse to be output during a second time interval T2 as $CP'_{I,T2}$, then pulse operations circuitry 358 is operable to perform a first one or more operations on $CP'_{I,T1}$ and a second one or more operations on $CP'_{1,T2}$. The first one or more operations may be determined, at least in part, based on to which quantum element the pulse $CP_{1,T1}$ is to be sent, and the second one or more operations may be determined, at least in part, based on to which quantum element the pulse $CP_{1,T2}$ is to be sent. The determination of the first one or more operations and second one or more operations may be performed dynamically during runtime.

The transmit analog frontend 362 comprises circuitry operable to concurrently process up to K digitized signals $DO_k$ to generate up to K concurrent analog signals $AO_k$ to be output to the quantum processor 218. Such processing may comprise, for example, digital-to-analog conversion, filtering, upconversion, downconversion, amplification, attenuation, time division multiplexing/demultiplexing, frequency division multiplexing/demultiplexing and/or the like. In an example implementation, each of the one or more of signal paths $313_0$-$313_{K-1}$ (FIG. 3A) represents a respective portion of Tx analog frontend circuit 362 as well as a respective portion of interconnect 212 (FIG. 2) between the Tx analog frontend circuit 362 and the quantum processor 218. Although there is one-to-one correspondence between the number of DO signals and the number of AO signals in the example implementation described here, such does not need to be the case. In another example implementation, the analog frontend 362 is operable to map more (or fewer) signals DO to fewer (or more) signals AO. In an example implementation the transmit analog frontend 362 is operable to process digitized signals $DO_0$-$DO_{K-1}$ as K independent outbound pulses, as K/2 two-pulse pairs, or process some of signals $DO_0$-$DO_{K-1}$ as independent outbound pulses and some signals $DO_0$-$DO_{K-1}$ as two-pulse pairs (at different times and/or concurrently).

The output manager 360 comprises circuitry operable to route any one or more of signals $CP_0$-$CP_{L-1}$ to any one or more of signal paths $313_0$-$313_{K-1}$. As just one possible example, signal path $313_0$ may comprise a first path through the analog frontend 362 (e.g., a first mixer and DAC) that outputs $AO_0$ and traces/wires of interconnect 212 that carry signal $AO_0$; signal path $313_1$ may comprise a second path through the analog frontend 362 (e.g., a second mixer and DAC) that outputs $AO_1$ and traces/wires of interconnect 212 that carry signal $AO_1$, and so on. In an example implementation, the output manager 360 comprises one or more switch networks, multiplexers, and/or the like for dynamically reconfiguring which one or more signals $CP_0$-$CP_{L-1}$ are routed to which signal paths $313_0$-$313_{K-1}$. This may enable time division multiplexing multiple of the signals $CP_0$-$CP_{L-1}$ onto a single signal path $313_k$ and/or time division demultiplexing components (e.g., time slices) of a signal $CP_m$ onto multiple of the signal paths $313_0$-$313_{K-1}$. In an example implementation, the output manager 360 comprises one or more mixers and/or filters for frequency division multiplexing multiple of the signals $CP_0$-$CP_{M-1}$ onto a single signal path $313_k$ and/or frequency division demultiplexing components (e.g., frequency bands) of a signal $CP_m$ onto multiple of the signal paths $313_0$-$313_{K-1}$. The signal routing and multiplexing/demultiplexing functions performed by the output manager 360 enables: routing outbound pulses from a particular pulser $302_I$ to different ones of the signal paths $313_0$-$313_{K-1}$ at different times; routing outbound pulses from a particular pulser $302_I$ to multiple of the signal paths $313_0$-$313_{K-1}$ at the same time; and multiple of the pulsers $302_0$-$302_{L-1}$ generating pulses for the same signal path $313_k$ at the same time. In the example implementation shown, routing of the signals $CP_0$-$CP_{L-1}$ among the signal paths $313_0$-$313_{K-1}$ is controlled by digital control signals out_slct$_0$-out_slct$_{L-1}$ from the pulsers $302_0$-$302_{L-1}$. In another implementation, the output manager 360 may be operable to autonomously determine the appropriate routing (e.g., where the quantum algorithm description includes instructions to be loaded into memory of, and executed by, the output manager 360). In an example implementation, at any given time, the output manager 360 is operable to concurrently route K of the digitized signals $CP_0$-$CP_{L-1}$ as K independent outbound pulses, concurrently route K/2 of the digitized signals $CP_0$-$CP_{L-1}$ as two-pulse pairs, or route some of signals $CP_0$-$CP_{L-1}$ as independent outbound pulses and some others of the signals $CP_0$-$CP_{L-1}$ as multi-pulse sets (at different times and/or concurrently).

The digital manager 354 comprises circuitry operable to process and/or route digital control signals (DigCtrl$_0$-DigCtrl$_{J-1}$) to various circuits of the quantum controller 210 and/or external circuits coupled to the quantum controller 210. In the example implementation shown, the digital manager receives, from each pulser $302_I$, (e.g., via one or more of signal paths $304_0$-$304_{N-1}$) a digital signal $D_I$ that is to be processed and routed by the digital manager 354, and a control signal D_port$_I$ that indicates to which output port(s) of the digital manager 354 the signal D$_I$ should be routed. The digital control signals may be routed to, for example, any one or more of circuits shown in FIG. 3B, switches/gates which connect and disconnect the outputs AO$_0$-AO$_{K-1}$ from the quantum processor 218, external circuits coupled to the quantum controller 210 such as microwave mixers and amplifiers, and/or any other circuitry which can benefit from on real-time information from the pulser circuits 302$_0$-302$_{L-1}$. Each such destination of the digital signals may require different operations to be performed on the digital signal (such as delay, broadening, or digital convolution with a given digital pattern). These operations may be performed by the digital manager 354 and may be specified by control signals from the pulsers 302$_0$-302$_{L-1}$. This allows each pulser 302$_I$ to generate digital signals to different destinations and allows different ones of pulsers 302$_0$-302$_{L-1}$ to generate digital signals to the same destination while saving resources.

The data exchange circuitry 364 is operable to manage exchange of data among the various circuits shown in FIG. 3B. For example, while carrying out a quantum algorithm, a first pulser circuit 302$_1$ and a second pulser circuit 302$_2$ may sometimes need to exchange information. As just one example, pulser 302$_1$ may need to share, with pulser 302$_2$, the characteristics of an inbound signal AI$_1$ that it just processed so that pulser 302$_2$ can generate a raw outbound pulse CP'$_2$ based on the characteristics of AI$_1$. The data exchange circuitry 364 may enable such information exchange. The data exchange circuitry 364 is discussed in more detail below.

The I/O manager 368 is operable to route information between the quantum controller 210 and the quantum programming subsystem 202. Machine code quantum algorithm descriptions may be received via the I/O manager 368. Accordingly, the I/O manager 368 may comprise circuitry for loading the machine code into the necessary registers/memory (including any SRAM, DRAM, flash memory, programmable read only memory, etc.) of the quantum controller 210 as well as for reading contents of the registers/memory of the quantum controller 210 and conveying the contents to the quantum programming subsystem 202.

Figure 4:
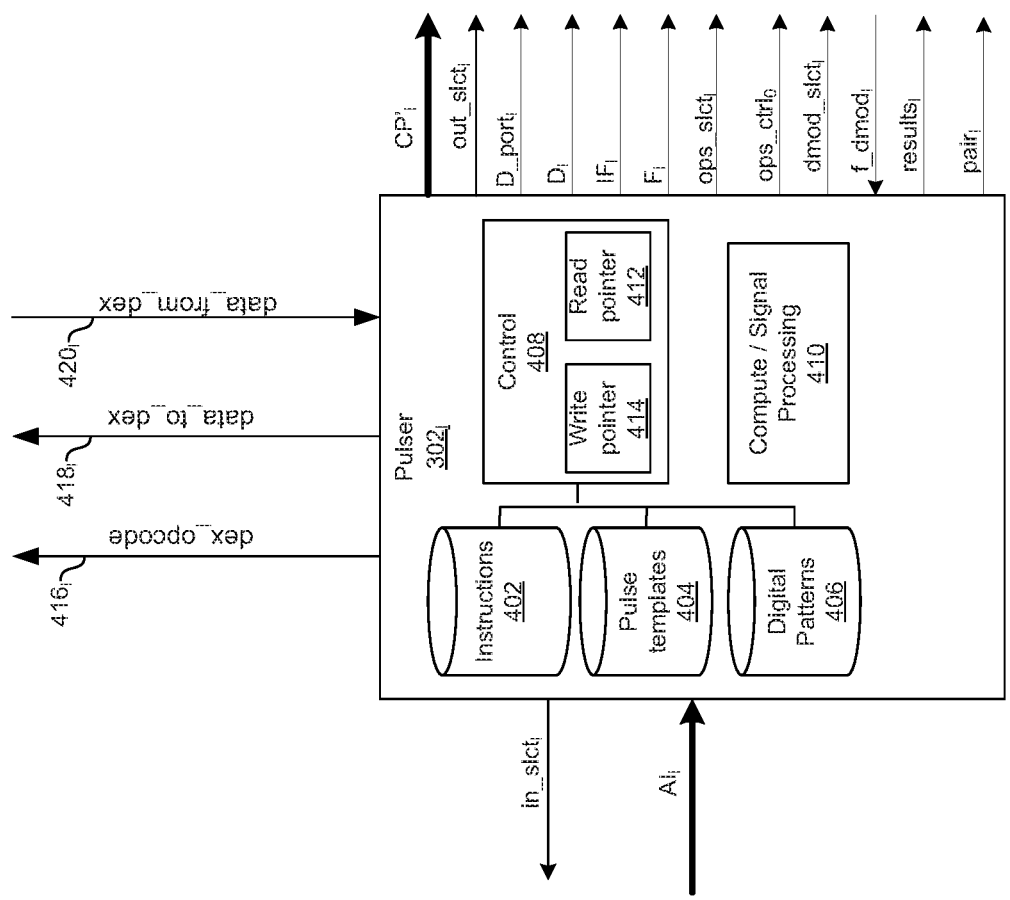
FIG. 4 shows an example implementation of the pulsar of FIG. 3B.

FIG. 4 shows an example implementation of the pulser of FIG. 3B. The example pulser 302$_I$ shown comprises instruction memory 402, pulse template memory 404, digital pattern memory 406, control circuitry 408, compute and/or signal processing circuitry (CSP) 410. The control circuitry comprises write pointer 414 and read pointer 412.

The memories 402, 404, 406 may comprise one or more be any type of suitable storage elements (e.g., DRAM, SRAM, Flash, etc.). The instructions stored in memory 402 are instructions to be executed out by the pulser 302$_I$ for carrying out its role in a quantum algorithm. Because different pulsers 302$_0$-302$_{L-1}$ have different roles to play in any particular quantum algorithm (e.g., generating different pulses at different times), the instructions memory 402 for each pulser 302$_I$ may be specific to that pulser. For example, the quantum algorithm description 206 from the quantum programming subsystem 202 may comprise a first set of instructions to be loaded (via I/O manager 368) into pulser 302$_0$, a second set of instructions to be loaded into pulser 302$_1$, and so on. Each pulse template stored in memory 404 comprises a sequence of one or more samples of any arbitrary shape (e.g., Gaussian, sinc, impulse, etc.) representing the pulses to be sent to pulse operation circuitry 358. Each digital pattern stored in memory 406 comprises a sequence of one or more binary values which may represent the digital pulses to be sent to the digital manager 354 for generating digital control signals DigCtrl$_0$-DigCtrl$_{J-1}$.

The control circuitry 408 is operable to execute the instructions stored in memory 402 to process inbound signal AI$_I$, generate raw outbound pulses CP'$_I$, and generate digital control signals in_slct$_I$, out_slct$_I$, D_port$_I$, D$_I$, IF$_I$, F$_I$, ops_slct$_I$, ops_ctrl$_I$, results$_I$, dmod_slct$_I$ and pair$_I$. In the example implementation shown, the processing of the inbound signal AI$_I$ is performed by the CSP circuitry 410 and based (at least in part) on the signal f_dmod$_I$.

The pulser 302$_I$ also comprises a data exchange circuit interface operable to exchange data with other pulsers via the data exchange circuit 364. In the example implementation shown, the interface comprises one or more (electrical and/or optical) channels for exchanging messages with other pulsers, where each message comprises an opcode field and a data field. In an example implementation, channel 416$_I$ is 1 bit wide and 4-bit opcodes are sent over up to four (or more in other implementations) clock cycles, the channel 418$_I$ is 2 bits wide and 8-bit parallel data is sent over up to four (or more in other implementations) clock cycles, and the channel 420$_I$ is 2 bits wide and 8-bit parallel data is received over up to four (or more in other implementations) clock cycles. In this example, the clock frequency used for the interface is 4 times the frequency of a main clock that clocks the control circuit 408 and the pulser thus sends or receives 8 bits of data on each cycle of the main clock. Other implementations may use different amounts of serialization/parallelization.

The read pointer 412 and write pointer 414 comprise memory operable to store values used for aligning data sent and received via the data exchange circuit 364. For example, the CSP circuits 410 may exchange 32 bit digitized (referred to herein as "analog") values. In the implementation in which 8 bits are communicated each main clock cycle, the read pointer 412 and write pointer 412 enable the pulser 302$_I$ to properly send and receive the data. For example, for 32 bits conveyed in 8-bit chunks, the pointers 412 and 414 indicate whether a particular chunk is a 1$^{st}$, 2$^{nd}$, 3$^{rd}$, or 4$^{th}$ chunk. Alignment of the pointers with a reference in the data exchange circuit 364 is described below with reference to FIG. 8.

The compute and/or signal processing circuitry (CSP) 410 is operable to perform computational and/or signal processing functions, which may comprise, for example, a classical processor operable to perform Boolean-algebra based logic and arithmetic functions (including, e.g., demodulation of inbound signals AI$_1$). The CSP 410 may comprise memory in which are stored instructions for performing the functions. The instructions may be specific to a quantum algorithm to be performed and be generated during compilation of a quantum machine specification and program defining a quantum algorithm to be performed.

In operation of an example implementation, generation of a raw outbound pulse CP'$_I$ comprises the control circuitry 408: (1) determining a pulse template to retrieve from memory 404 (e.g., based on a result of computations and/or signal processing performed by the CSP 410 of pulser 302I and/or CSP 410 of one or more other pulsers and received via data exchange circuit 364); (2) retrieving the pulse template; (3) performing some preliminary processing on the pulse template (e.g., based on a result of computations and/or signal processing performed by the CSP 410 of pulser 302I and/or CSP 410 of one or more other pulsers and received via data exchange circuit 364); (4) determining the values of F, IF, pair$_I$, ops_slct$_I$, and dmod_slct$_I$ to be sent to the pulse operation manager 356 (as predetermined in the quantum algorithm description and/or determined dynamically based on results of computations and/or signal processing performed by the CSP 410 and/or CSP 410 of one or more other pulsers and received via data exchange circuit 364); (5) determining the value of ops_ctrl$_I$ to be sent to the pulse operation circuitry 358; (6) determining the value of in_slct$_I$ to be sent to the input manager 352; (7) determining a digital pattern to retrieve from memory 406 (as predetermined in the quantum algorithm description and/or determined dynamically based on results of computations and/or signal processing performed by the CSP 410 and/or CSP 410 of one or more other pulsers and received via data exchange circuit 364); (8) outputting the digital pattern as D$_I$ to the digital manager along with control signal D_port$_I$ (as predetermined in the quantum algorithm description and/or determined dynamically based on results of computations and/or signal processing performed by the CSP 410); (9) outputting the raw outbound pulse CP'$_I$ to the pulse operations circuitry 358; (10) outputting results$_I$ to the I/O manager.

Figure 5:
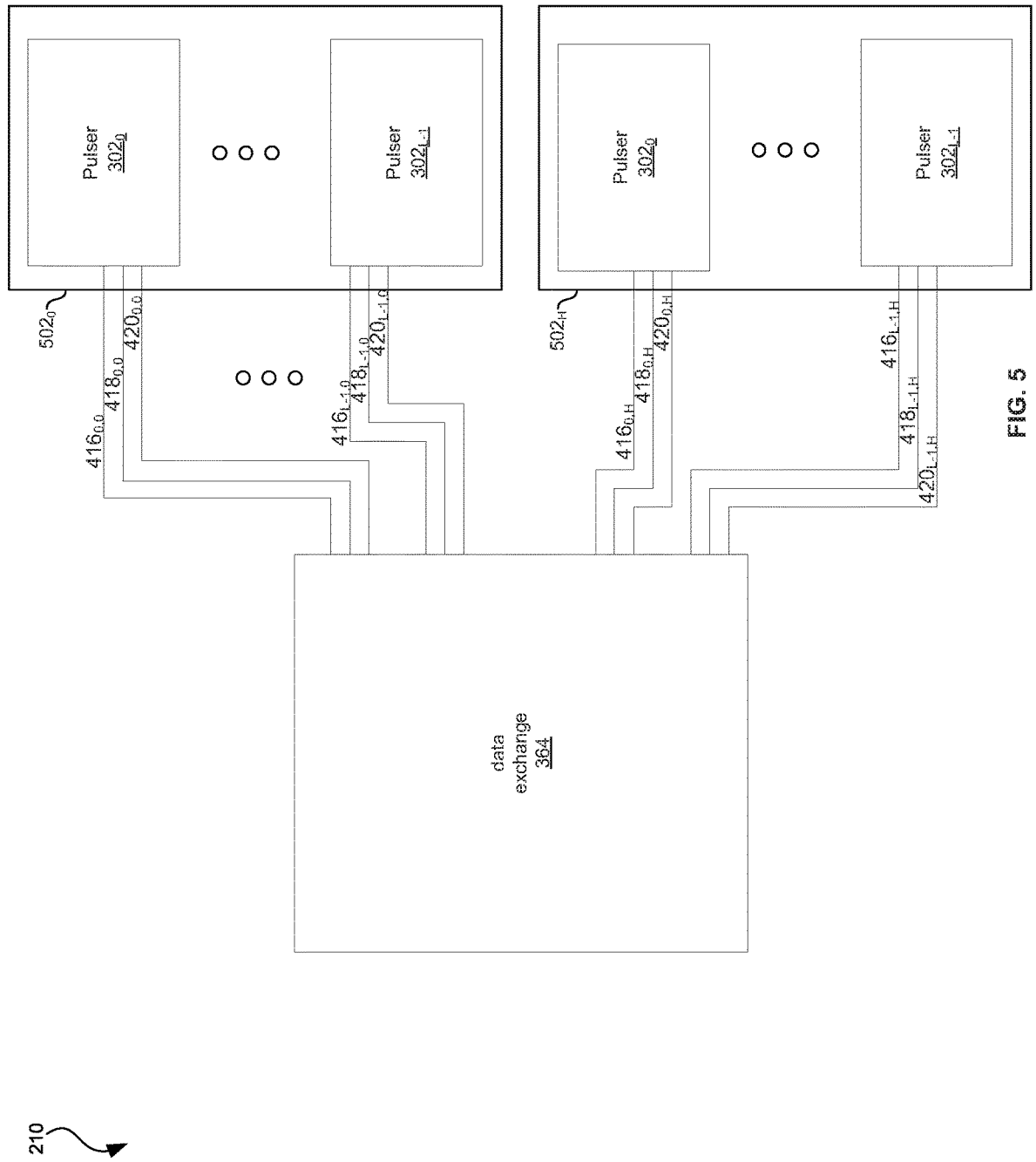
FIG. 5 shows quantum control data exchange circuit interconnecting a plurality of pulsers residing on a plurality of physically separate quantum control modules.

FIG. 5 is shows quantum control data exchange circuit interconnecting a plurality of pulsers residing on a plurality of physically separate quantum control modules. In the example implementation shown, a data exchange circuit 364 interconnects H (an integer) quantum control modules 502 each comprising L pulsers 302, thus the data exchange circuit 364 is operable to interconnect H*L pulsers in an any-to-any manner. In an example implementation this may comprise 256 or more pulsers 302 (supporting 256 or more quantum elements). The time required for conveying data from any of the pulsers $302_{0,0}$-$302_{L-1,H}$ to any other of the pulsers $302_{0,0}$-$302_{L-1,H}$ may be deterministic and within the coherence time of a quantum element.

Figure 6A:
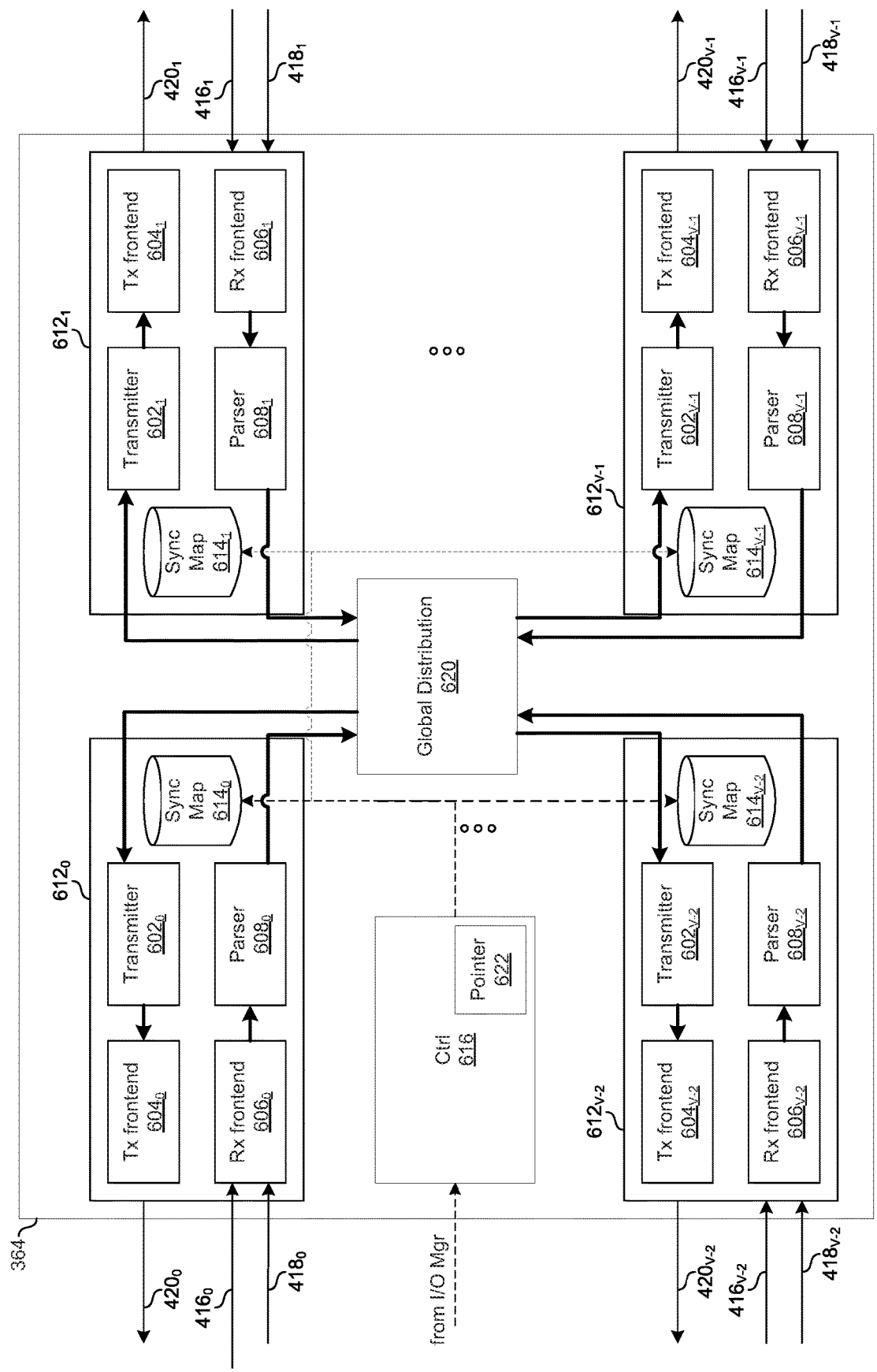
FIG. 6A shows an example implementation of the quantum control data exchange circuit.

FIG. 6A shows an example implementation of the quantum control data exchange circuit comprising V (an integer) interface circuits $612_0$-$612_{V-1}$, control circuit 616, and global distribution circuit 620.

The control circuit 616 is operable to manage communication of data between the data exchange circuit 364 and the quantum programming subsystem 202 (e.g., the control circuit 616 may comprise a PCIe bus controller for such communications). The control circuit 616 is also operable to manage a global read pointer 622 and global write pointer 623 that determine which portion of data is written to or read from a copy register during a particular clock cycle. This is further described below with reference to FIG. 8.

The global distribution circuit 620 is operable to interconnect the parsers $608_0$-$608_{V-1}$ and the transmitters $602_0$-$602_{V-1}$ such that each transmitter $608_V$ can read data from one or more registers of any of the parsers $608_0$-$608_{V-1}$.

Each of the interface circuits $612_v$ (v an integer between 0 and V–1) comprises a transmit (Tx) frontend circuit $604_v$, a transmitter circuit $602_v$, a receive (Rx) frontend circuit $606_v$, a parser circuit $608_v$, a sync map register $614_v$ and sync status register $616_v$.

Each Tx frontend circuit $604_v$ is operable to receive parallel data from transmitter $602_v$ and serialize the data before outputting it onto channel $420_v$. The Tx frontend $604_v$ provides a configurable delay (e.g., in increments on the order of picoseconds up to a total adjustment of 1 ns). In an example implementation, the Tx frontend circuit $604_v$ receives multiple bits in parallel on each cycle of a main clock rate and serializes the data into fewer bits transmitted serially at a higher clock frequency.

Each transmitter $602_v$ is operable to receive data from the global distribution circuit 620 and output the data to the Tx frontend 604 for transmission onto the channel 420.

Each Rx frontend circuit $606_v$ is operable to receive serial data from the channels $416_v$ and $418_v$ and deserialize the received bits before outputting them to parser $608_v$. In an example implementation, on each cycle of the interface clock, which is 4 times the frequency of the main clock, the Rx frontend receives 2 bits of data on channel $418_v$, and 1 bit of opcode on channel $416_i$. The Rx frontend $606_v$ then performs deserialization such that 8-bits of data and a 4-bit opcode is passed to the parser $608_v$ on each cycle of the main clock main clock.

Each sync map $614_v$ stores an indication of whether pulser $302_v$ is to operate synchronously with one or more of the other V–1 pulsers 302 and, if so, which pulsers of the pulses 302 that includes. The sync map $614_v$ may, for example, store a bitmap for each instruction or instruction group to be executed by pulser $302_v$, where each bit in the bitmap corresponds to one of the pulsers $302_0$-$302_{V-1}$ and the asserted bits indicate which of the pulsers $302_0$-$302_{V-1}$ are to operate synchronously for that instruction or instruction group.

Each sync status register $616_v$ indicates which of the pulsers $302_0$-$302_{V-1}$ are ready to begin synchronous operation. In an example implementation, each interface circuit $612_0$ repeatedly broadcasts its sync status (i.e., whether the pulser $302_I$ to which it is connected is ready to begin synchronous operation) to each other of the interface circuits $612_0$-$612_{V-1}$ and the broadcast values received by interface circuit $612_v$ is stored in sync status register $616_v$. Thus, when the sync status register $616_v$ matches the value in the sync map $614_v$ the pulser $302_I$ connected to interface circuit $612_v$ can begin synchronous operation.

Figure 6B:
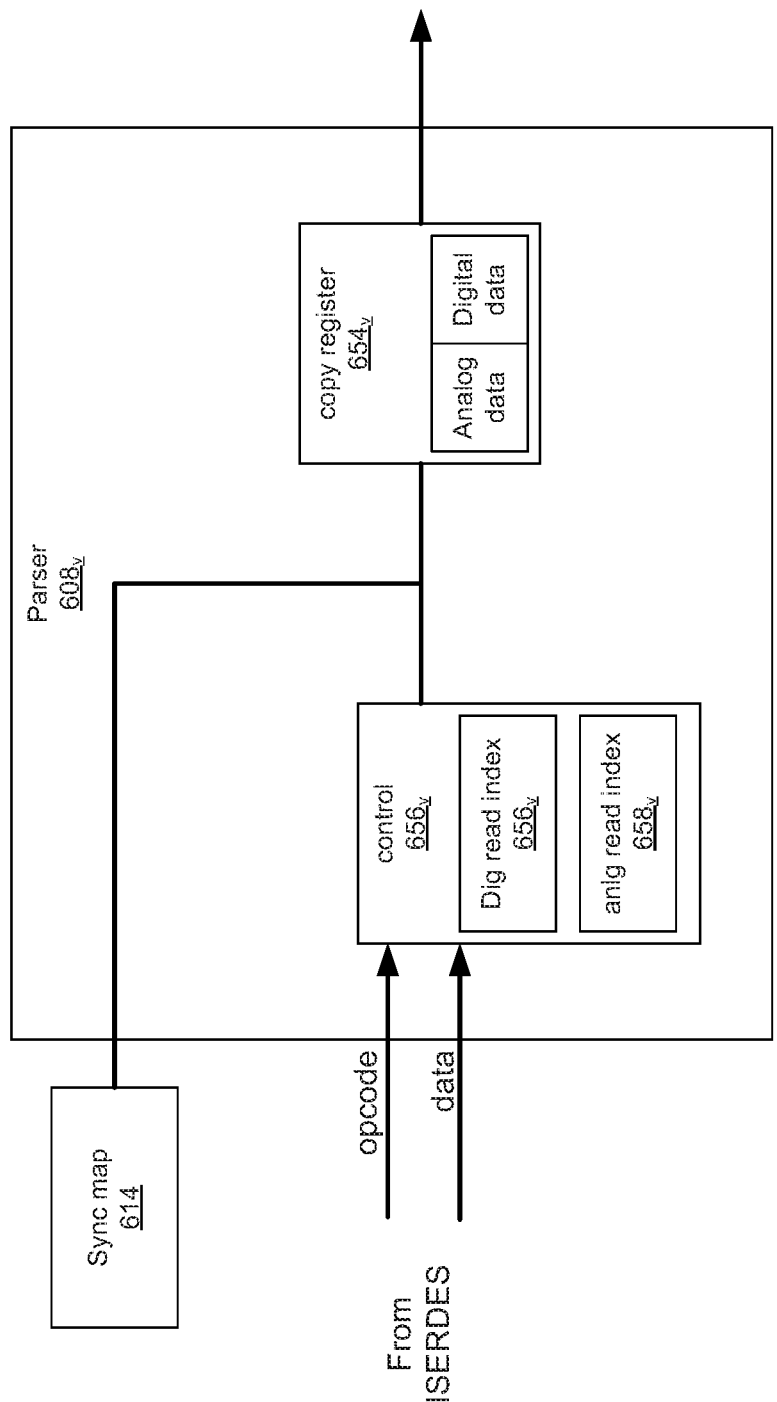
FIG. 6B shows an example implementation of the parser circuit.

FIG. 6B shows an example implementation of the quantum controller interface circuit $612_v$ comprising copy register $654_v$ and control circuitry $656_v$.

The copy register $654_v$ is operable to store data values received via channel $418_v$ such that those values can be read by any other of the interface circuits $612_0$-$612_{V-1}$ via the global distribution circuit 620. The copy register may store "analog" (e.g., 32-bit digitized values) values at a first one or more addresses and digital values (e.g., 2-bits) at a second one or more addresses.

The control circuit $656_v$ is operable to process the incoming parallel opcode and data from the Rx frontend $606_v$, and then perform the operation indicated by the opcode.

In an example implementation, there are 7 opcodes corresponding to 7 operations, which are described next.

For a "no operation" opcode, the parser will not be performing any operation.

For a "sync" opcode, the parser $608_v$ fetches the sync map from the sync memory $614_v$.

The address in memory from which the sync map is fetched is determined by the accompanying data received over channel $418_v$. In an example implementation, the sync map is a bitmap specifying with which others of the pulsers $302_0$-$302_L$ the pulser connected to interface $612_v$ should sync for this operation. After the parser $608_v$ fetches the sync map, a sync indication will be sent to all the specified pulsers via the global distribution circuit 620. The sync maps may be loaded from the quantum programming subsystem 202 via the I/O manager 368 and the control circuit 616 (e.g., over a PCIe connection).

For an "analog write" opcode, the parser $608_v$ updates its analog copy register $654_v$ with the data value received from the Rx frontend $606_v$ (e.g., 32 bits at 4 bits per cycle, thus taking 4 cycles to complete). The value may have been generated by the CSP 410 of the pulser 302 connected to interface 612$_V$.

For a "digital write" opcode, the parser 608$_V$ updates the copy register 654$_V$ with the data value received from the Rx frontend 606$_V$. The value may have been generated by the CSP 410 of the pulser 302 connected to interface 612$_V$.

For an "analog read" opcode, the parser 608$_V$ updates the analog read index 658$_V$ with the data value received from the Rx frontend 606$_V$ (e.g., 8 bits per cycle, thus taking 1 cycles to complete). The analog read index tells the transmitter 602$_V$ from which of the interface circuits 612$_0$-612$_{V-1}$ to read analog copy register contents for transmission onto the channel 420$_V$.

For a "digital read" opcode, the parser 608$_V$ updates the digital read index 656$_V$ with the data value received from the Rx frontend 606$_V$ (e.g., 8 bit at 2 bits per cycle, thus taking 4 cycles to complete). The digital read index tells the transmitter 602$_V$ from which of the interface circuits 612$_0$-612$_{V-1}$ to read digital copy register contents for transmission onto the channel 420$_V$.

For a "calibration" opcode, the parser will perform a calibration routine. An example calibration routine is described below with reference to FIG. 7.

Figure 7:
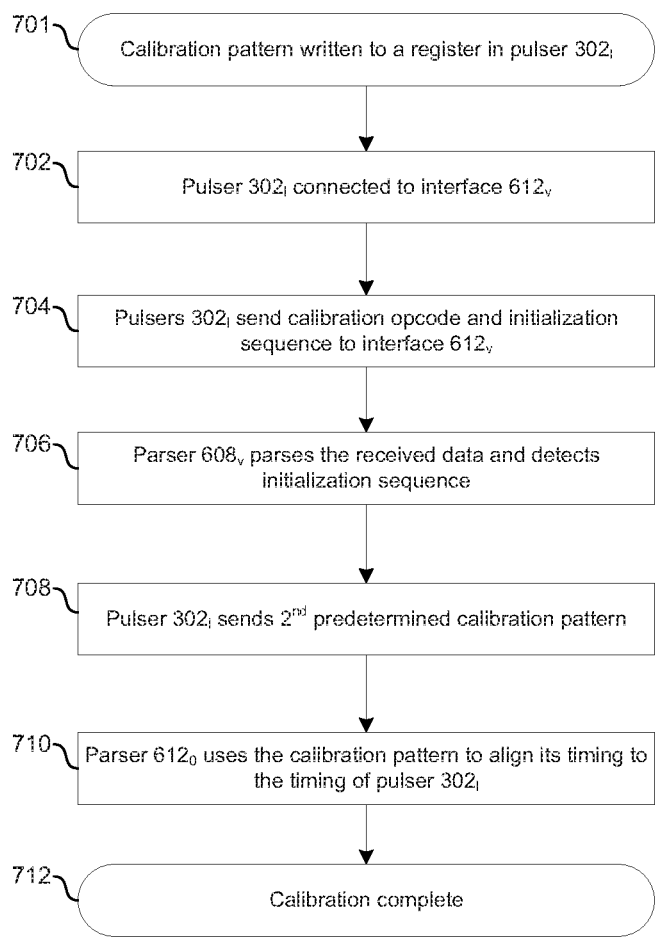
FIG. 7 is a flowchart showing an example calibration process for the pulsers and quantum control data exchange circuit.

FIG. 7 is a flowchart showing an example calibration process for the pulsers and quantum control data exchange circuit.

In block 701, a calibration pattern is written to calibration pattern registers in pulser 302$_I$ and the data exchange circuit 364 via the I/O Manager 368.

In block 702, the pulser 302$_I$ is connected to interface circuit 612$_V$ of data exchange circuit 364.

Next, in block 704, the pulser 302$_I$ sends the calibration opcode along with an initialization data sequence. In one example, the calibration opcode is 4'b1111 and the initialization data sequence is 8'b11111111 and this is sent for at least 2 cycles to ensure the parser 608$_V$ detects the initialization sequence despite the timing of the Rx frontend 606$_V$ not yet being synchronized to the clock of the pulser 302$_I$.

Next, in block 706, the parser 608$_V$ parses the received data and detects the initialization sequence.

In block 708, the pulser 302$_I$ sends a predetermined calibration pattern occupying both the opcode and data portions. The calibration pattern may be sent for a number of clock cycles that assures (with an acceptable probability) synchronization.

In block 710, parser 612$_0$ uses the calibration pattern to align its timing with the timing of pulser 302$_I$. Calibration is then complete in block 712.

To illustrate with a specific example, assume that via choosing proper cable lengths to interconnect modules 502 and data exchange circuit 364, the delay between each pulser 302$_I$ and the data exchange circuit 364 can be up to 1 ns (for example). If pulser 302$_I$ sends pattern 00000001, the parser 612$_0$ may receive 00000001 or 00000010 or 10000000 in the data exchange unit. The Rx frontend is then calibrated so that the parser 612$_0$ receives 00000001. Thus, in this example, there are two criteria for the calibration pattern: it has to have a distinguishable 0 to 1 transition, and it needs to enable detection of offsets larger than 1 ns delay. For instance, in one implementation 01010101 is no good because the parser 612$_0$ can't distinguish 2 ns delay in this pattern. Assuming a pattern meeting these criteria, is that the parser 612$_0$ either detects the calibration pattern or not. If not, then the parser 612$_0$ may increase the Rx frontend delay in the smallest step possible resolution and check again for the pattern matching. It may continue to do so until it finds the desired pattern.

Figure 8:
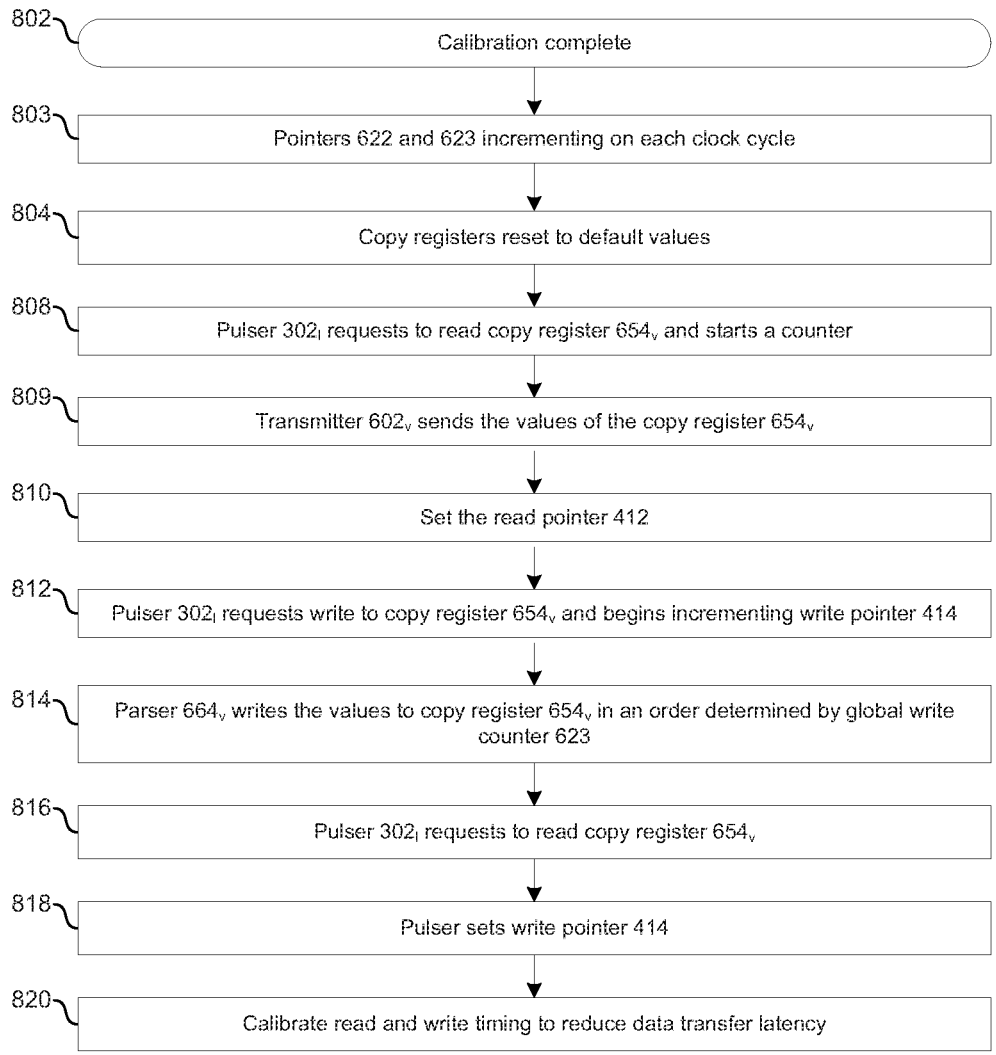
FIG. 8 is a flowchart showing an example process for aligning pointers in the pulsers with the pointer in the quantum control data exchange circuit.

FIG. 8 is a flowchart showing an example process for aligning pointers in the pulsers with the pointer in the quantum control data exchange circuit.

The process begins in block 802 in which calibration (e.g., as described above with reference to FIG. 7) is complete.

Next in block 803, global read pointer 622 and global write pointer 623 begin incrementing on each clock cycle (wrapping back to 0 on the next clock cycle after reaching a determined maximum value, e.g., 4). In an example implementation, the value of the global read pointer 622 starts at 0 and the value of the global write pointer 623 starts at 1 and the global write pointer 623 stays ahead of the global read pointer by 1.

Next, in block 804, the copy registers 654$_V$ are reset to default values that indicate their ordering within the copy register. For example, a copy register may comprise four 8-bit registers and values 8'hAA, 8'hBB, 8'hCC and 8'h DD may be stored respectively to the four registers.

Next, in block 808, pulser 302$_I$ requests to read the values in copy register 654$_V$ from parser 608$_V$. Concurrent with sending the request, the pulser 302$_I$ also starts incrementing a read counter on each clock cycle.

In block 809, transmitter 602$_V$ sends the values of the copy register 654$_V$ in an order that depends on the value of the global read pointer 622. Continuing the above example, if the value of the pointer 622 is 2 when the transmitter 602$_V$ reads the first value from the copy register 654$_V$ (which stores 32'hAABBCCDD), then the transmitter 602$_V$ sends 8'hBB on the first transmit cycle, 8'hAA on the next cycle, and so on.

Next, in block 810, the values arrive at the pulser 302$_I$. Based on the order of the read data, the pulser 302$_I$ determines the value of the global read pointer 622 at the time the transmitter 602$_V$ read the first value from the copy register 654$_V$. For example, again using the above example, the pulser 302$_I$ receiving 8'hBB on the first read tells the pulser 302$_I$ that the value of global read pointer 622 was 2 at the time the transmitter 602$_V$ read the first value from the copy register 654$_V$. That information combined with the value of the read counter that was started in block 808 is used to set the read pointer 412. The read pointer 412, which determines the position in the read register of pulser 302$_I$ to which the values received from the transmitter 602$_V$ during read are to be written, then increments on each clock cycle to remain in sync with global read pointer 622 (in this example wrapping to 0 every 4$^{th}$ cycle; 2, 3, 0, 1, 2, and so on).

In block 812, pulser 302$_I$ writes distinguishable set of values to copy register 654$_V$ and begins incrementing its write pointer 414 on each clock cycle.

In block 814, the Parser 608$_V$ writes the arriving values into the copy register 654$_V$, according to the global write pointer 623.

In block 816, Pulser 302$_I$ then requests to read the same set of values from the copy register value 654$_V$.

In block 818, according to the offset between the original written set of values and the received set of values, pulser 302$_I$ can now align its write pointer 414 to the global write pointer 623. For example, pulser 302$_I$ can write 4 set of values 8'h00 (first), 8'h00, 8'h00, 8'h01 (last). If pulser 302$_I$ reads back later (and reconstructs the data using its read pointer 412) 8'h00, 8'h00, 8'h01, 8'h00, then the pulser 302$_I$ write pointer 414 is trailing the global write pointer 623 by an offset of 3.

The latency of read and write operations may be different and the length of each operation may have a multi-cycle duration. Thus, a read request sent immediately following a write request may be executed, at least partially, concurrently with the write operation in the interface circuit $612_y$. It may be desirable to calibrate the minimal time that is needed between a write request and a read request so that the read request results in reading the data that was written due to the write request.

In block 820, having aligned read pointer 412 of the pulser $302_I$ with the global read pointer 623, and aligned the write pointer 414 of the pulser $302_I$ with the global write pointer 622, it is now possible to calibrate the timing of when pulser $302_i$ (i between 0 and L−1) issues a write request to write data to copy register $654_I$ and when pulser $302_j$ (j between 0 and L−1 and ≠i) issues a read request to read that data from copy regiser $654_i$. Such calibration may optimize for the minimal latency for data exchange from pulser $302_i$ to pulser $302_j$.

In accordance with an example implementation of this disclosure, a quantum control data exchange circuit (e.g., 504) that comprises a plurality of interface circuits (e.g., $612_0$-$612_{V-1}$) and memory (e.g., 614, 652, 654, 656, and/or 658), wherein a first interface circuit (e.g., $612_0$) of the plurality of interface circuits is operable to receive a first message from a first quantum control pulse generation circuit (e.g., $302_0$) of a plurality of quantum control pulse generation circuits, wherein the message comprises a first opcode. In response to the opcode being a sync opcode, the first interface circuit may send a sync indication to a determined one or more others of the plurality of interface circuits. In response to the opcode being a write opcode, the first interface circuit may extract data from the first message and write the data to the memory (e.g., to 654). In response to the opcode being a read opcode, the first interface circuit may read data from the memory (e.g., 6652 or 654) and transmit the read data to the first quantum control pulse generation circuit. The determined one or more others of the plurality of interface circuits (e.g., one or more of $612_1$ to $612_{V-1}$) may be determined based on contents of a sync map in the memory. The sync map may indicates, for each of a plurality of time intervals, which of the plurality of quantum control pulse generation circuits are to be synchronized during that time interval, such that a first two or more of the plurality of pulse generation circuits can be synchronized during a first of the plurality of time intervals and a second two or more of the plurality of pulse generation circuits can be synchronized during a second of the plurality of time intervals. The first interface circuit may be operable to: in response to the opcode being a write opcode, detect whether the write opcode is a first-type write opcode (e.g., analog write opcode) or a second-type write opcode (e.g., digital write opcode). If the opcode is the first-type write opcode, the first interface circuit may write the data to a first register of the memory (e.g., 658). If the opcode is a second-type write opcode, the first interface circuit may write the data to a second register of the memory. The first interface circuit may be operable to, in response to the opcode being a read opcode, extract an index from the first message. The first interface circuit may determine the location within the memory from which to perform the read of the read data based on the index. The index may corresponds to from which of the plurality of quantum control pulse generation circuits the read data originated (e.g., an index of 1 may indicate to read data received via interface circuit $612_1$, an index of 2 may indicate to read data received via interface circuit $612_2$, and so on). The first interface circuit may be operable to, in response to the opcode being a read opcode, detect whether the read opcode is a first-type read opcode (e.g., analog read opcode) or a second-type read opcode (e.g., digital read opcode). If the opcode is a first-type read opcode, the first interface circuit may read data from a first register of the memory (e.g., 658). If the opcode is a second-type read opcode, the first interface circuit may read data from a second register of the memory (e.g., 656). The first quantum control pulse generation circuit (e.g., $302_0$) may comprise a first processor (e.g., classical processor 410). A second quantum control pulse generation circuit (e.g., $302_1$) may comprise a second processor (e.g., classical processor 410). The first quantum control pulse generation circuit may be operable to receive, via the quantum exchange circuit, a value generated by the second processor. The first quantum control pulse generation circuit may: determine phase, frequency, timing, and/or amplitude of a quantum control pulse based on a first value computed by the second processor and/or a second value computed by the first processor; and generate the quantum control pulse to have the determined phase, frequency, timing, and/or amplitude.

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical implementation may comprise one or more application specific integrated circuit (ASIC), one or more field programmable gate array (FPGA), and/or one or more processor (e.g., x86, x64, ARM, PIC, and/or any other suitable processor architecture) and associated supporting circuitry (e.g., storage, DRAM, FLASH, bus interface circuits, etc.). Each discrete ASIC, FPGA, Processor, or other circuit may be referred to as "chip," and multiple such circuits may be referred to as a "chipset." Another implementation may comprise a non-transitory machine-readable (e.g., computer readable) medium (e.g., FLASH drive, optical disk, magnetic storage disk, or the like) having stored thereon one or more lines of code that, when executed by a machine, cause the machine to perform processes as described in this disclosure. Another implementation may comprise a non-transitory machine-readable (e.g., computer readable) medium (e.g., FLASH drive, optical disk, magnetic storage disk, or the like) having stored thereon one or more lines of code that, when executed by a machine, cause the machine to be configured (e.g., to load software and/or firmware into its circuits) to operate as a system described in this disclosure.

As used herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As used herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As used herein, the term "exemplary" means serving as a non-limiting example, instance, or illustration. As used herein, the terms "e.g.," and "for example" set off lists of one or more non-limiting examples, instances, or illustrations. As used herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.). As used herein, the term "based on" means "based at least in part on." For example, "x based on y" means that "x" is based at least in part on "y" (and may also be based on z, for example).

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A system comprising:
    a quantum control data exchange circuit that comprises a plurality of interface circuits and memory, wherein a first interface circuit of the plurality of interface circuits is operable to:
        receive a first message from a first quantum control pulse generation circuit of a plurality of quantum control pulse generation circuits, wherein the first message comprises a first opcode;
        in response to the first opcode being a sync opcode, send a sync indication to a determined one or more others of the plurality of interface circuits;
        in response to the first opcode being a write opcode, extract data from the first message and write the data to the memory; and
        in response to the first opcode being a read opcode, read data from the memory and transmit the read data to the first quantum control pulse generation circuit.

2. The system of claim 1, wherein the determined one or more others of the plurality of interface circuits are determined based on contents of a sync map in the memory.

3. The system of claim 2, wherein the sync map indicates, for each of a plurality of time intervals, which of the plurality of quantum control pulse generation circuits are to be synchronized during that time interval, such that a first two or more of the plurality of quantum control pulse generation circuits can be synchronized during a first of the plurality of time intervals and a second two or more of the plurality of quantum control pulse generation circuits can be synchronized during a second of the plurality of time intervals.

4. The system of claim 1, wherein the first interface circuit is operable to:
    in response to the first opcode being a write opcode, detect whether the write opcode is a first-type write opcode or a second-type write opcode;
    if the first opcode is a first-type write opcode, write the data to a first register of the memory; and
    if the first opcode is a second-type write opcode, write the data to a second register of the memory.

5. The system of claim 1, wherein:
    the first interface circuit is operable to, in response to the first opcode being a read opcode, extract an index from the first message; and
    determine a location within the memory from which to perform the read of the read data based on the index.

6. The system of claim 5, wherein the index corresponds to from which of the plurality of quantum control pulse generation circuits the read data originated.

7. The system of claim 1, wherein the first interface circuit is operable to:
    in response to the first opcode being a read opcode, detect whether the read opcode is a first-type read opcode or a second-type read opcode;
    if the read opcode is a first-type read opcode, read data from a first register of the memory; and
    if the read opcode is a second-type read opcode, read data from a second register of the memory.

8. The system of claim 1, comprising the plurality of quantum control pulse generation circuits.

9. The system of claim 8, wherein:
    the first quantum control pulse generation circuit comprises a first processor;
    a second quantum control pulse generation circuit comprises a second processor;
    the first quantum control pulse generation circuit is operable to:
        receive, via the quantum control data exchange circuit, a value generated by the second processor;
        determine phase, frequency, timing, and/or amplitude of a quantum control pulse based on a first value computed by the second processor; and
        generate the quantum control pulse.

10. The system of claim 9, wherein the first quantum control pulse generation circuit is operable to determine the phase, frequency, timing, and/or amplitude of the quantum control pulse based on a second value computed by the first processor.

11. A method comprising:
    receive, by a first interface circuit of a plurality of interface circuits of a quantum control data exchange circuit, a first message from a first quantum control pulse generation circuit of a plurality of quantum control pulse generation circuits, wherein the first message comprises a first opcode;
    in response to the first opcode being a sync opcode, sending, by the first interface circuit, a sync indication to a determined one or more others of the plurality of interface circuits;
    in response to the first opcode being a write opcode, extracting, by the first interface circuit, data from the first message and writing, by the first interface circuit, the data to memory; and
    in response to the first opcode being a read opcode, reading, by the first interface circuit, data from the memory and transmitting, by the first interface circuit, the read data to the first quantum control pulse generation circuit.

12. The method of claim 11, comprising determining, by the first interface circuit, the determined one or more others of the plurality of interface circuits based on contents of a sync map in the memory.

13. The method of claim 12, wherein the sync map indicates, for each of a plurality of time intervals, which of the plurality of quantum control pulse generation circuits are to be synchronized during that time interval, such that a first two or more of the plurality of quantum control pulse generation circuits can be synchronized during a first of the plurality of time intervals and a second two or more of the plurality of quantum control pulse generation circuits can be synchronized during a second of the plurality of time intervals.

14. The method of claim 11, comprising:
in response to the first opcode being a write opcode, detecting, by the first interface circuit, whether the write opcode is a first-type write opcode or a second-type write opcode;
if the write opcode is a first-type write opcode, writing, by the first interface circuit, the data to a first register of the memory; and
if the write opcode is a second-type write opcode, writing, by the first interface circuit, the data to a second register of the memory.

15. The method of claim 11, comprising:
in response to the first opcode being a read opcode, extracting, by the first interface circuit, an index from the first message; and
determining, by the first interface circuit, a location within the memory from which to perform the read of the read data based on the index.

16. The method of claim 15, wherein the index corresponds to from which of the plurality of quantum control pulse generation circuits the read data originated.

17. The method of claim 11, comprising:
in response to the first opcode being a read opcode, detecting, by the first interface circuit, whether the read opcode is a first-type read opcode or a second-type read opcode;
if the read opcode is a first-type read opcode, reading, by the first interface circuit, data from a first register of the memory; and
if the read opcode is a second-type read opcode, reading, by the first interface circuit, data from a second register of the memory.

18. The method of claim 11, comprising:
the first quantum control pulse generation circuit comprises a first processor;
a second quantum control pulse generation circuit comprises a second processor;
the first quantum control pulse generation circuit is operable to:
receiving, by a first quantum control pulse generation circuit via the quantum control data exchange circuit, a value generated by a processor;
determining, by the first quantum control pulse generation circuit, phase, frequency, timing, and/or amplitude of a quantum control pulse based on a first value computed by the processor; and
generating, by the first quantum control pulse generation circuit, the quantum control pulse.

19. The method of claim 18, comprising determining, by the first quantum control pulse generation circuit, the phase, frequency, timing, and/or amplitude of the quantum control pulse based on a second value computed by a second processor.

* * * * *